US010667090B2

(12) United States Patent
Edge

(10) Patent No.: US 10,667,090 B2
(45) Date of Patent: May 26, 2020

(54) FLEXIBLE PERIODIC AND TRIGGERED LOCATION OF A MOBILE DEVICE IN A WIRELESS NETWORK USING A CODEWORD

(71) Applicant: QUALCOMM Incorporated, San Diego, CA (US)

(72) Inventor: Stephen William Edge, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/261,344

(22) Filed: Jan. 29, 2019

(65) Prior Publication Data

US 2019/0313209 A1 Oct. 10, 2019

Related U.S. Application Data

(60) Provisional application No. 62/655,220, filed on Apr. 9, 2018, provisional application No. 62/674,597, filed on May 21, 2018.

(51) Int. Cl.
*H04W 4/029* (2018.01)
(52) U.S. Cl.
CPC .................. *H04W 4/029* (2018.02)
(58) Field of Classification Search
CPC ....... H04W 4/80; H04W 72/04; H04W 24/08; H04W 64/00
See application file for complete search history.

(56) References Cited

U.S. PATENT DOCUMENTS

| 10,080,098 B1 | 9/2018 | Edge | |
|---|---|---|---|
| 2018/0098279 A1 | 4/2018 | Edge | |
| 2019/0182665 A1* | 6/2019 | Edge | ..................... H04W 12/02 |

OTHER PUBLICATIONS

"3rd Generation Partnership Project; Technical Specification Group Services and System Aspects; Location Services (LCS); Service Description; Stage 1 (Release 14) ", 3GPP Standard, Technical Specification, 3GPP TS 22.071, 3rd Generation Partnership Project (3GPP), Mobile Competence Centre , 650, Route Des Lucioles , F-06921 Sophia-Antipolis Cedex , France, vol. SA WG1, No. V14.1.0, Sep. 25, 2015 (Sep. 25, 2015), pp. 1-55, XP051294332, [retrieved on Sep. 25, 2015], p. 29.
International Search Report and Written Opinion—PCT/US2019/015907—ISA/EPO—dated May 13, 2019.

* cited by examiner

*Primary Examiner* — Sam Bhattacharya
(74) *Attorney, Agent, or Firm* — Paradice and Li LLP

(57) ABSTRACT

Techniques are discussed herein for enabling an external client to request periodic or triggered location of a user equipment (UE) according to trigger criteria that are not visible to entities within a wireless network, using a codeword in a periodic and triggered location request that is sent to the UE. The codeword may be meaningful to the UE, but not to the wireless network, and may indicate particular types of triggered and/or periodic events to be detected and reported by the UE. A location report sent by the UE to the wireless network may contain a second codeword, indicating a type of triggered or periodic event detected by the UE, which may be conveyed by the wireless network to the external client without interpretation. Codewords may enable more flexibility for periodic and triggered location without impacting wireless networks.

30 Claims, 8 Drawing Sheets

FLEXIBLE PERIODIC AND TRIGGERED LOCATION OF A MOBILE DEVICE IN A WIRELESS NETWORK USING A CODEWORD

CROSS-REFERENCE TO RELATED APPLICATIONS

This application claims the benefit of U.S. Provisional Application Nos. 62/655,220, entitled "FLEXIBLE PERIODIC AND TRIGGERED LOCATION OF A MOBILE DEVICE USING A CODEWORD," filed Apr. 9, 2018, and 62/674,597, entitled "FLEXIBLE PERIODIC AND TRIGGERED LOCATION OF A MOBILE DEVICE USING A CODEWORD," filed May 21, 2018, which are assigned to the assignee thereof and which are expressly incorporated herein by reference in their entireties.

BACKGROUND

Field

The present disclosure relates generally to communication, and more specifically to techniques for supporting location services for a mobile device which is accessing a wireless network.

Relevant Background

The 3GPP control plane (CP) location solution for LTE wireless access supports periodic and triggered location of a target user equipment (UE) by an external client using several types of trigger events. These comprise a periodic trigger event, an area based trigger event (e.g. geofencing) and a motion based trigger event in which a trigger event corresponds to UE movement by more than a defined threshold straight line distance. While these existing trigger events provide some flexibility in supporting triggered location of a target UE, they have impacts to network elements to provide support (e.g. a GMLC, MME and E-SMLC) and place restrictions on trigger events that are reported. As an example, there is no support for time of day based trigger events, velocity based trigger events, location based trigger events other than the area event and motion event or on combinations of triggers (e.g. a location plus time of day trigger). Therefore, current support is both limited and an impact to a network. It would be useful to remove these drawbacks. In the case of 5G, periodic and triggered location equivalent to that for LTE is being developed. Therefore, similar problems may later exist for 5G and may benefit from similar solutions.

SUMMARY

An external client may request periodic or triggered location of a user equipment (UE) according to trigger criteria that are not visible to entities within a wireless network, using a codeword in a periodic and triggered location request that is sent to the UE. The codeword may be meaningful to the UE, but not to the wireless network, and may indicate particular types of triggered and/or periodic events to be detected and reported by the UE. The particular type(s) of triggered and/or periodic event, however, need not be known to the entities in the wireless network, which may help coordinate the periodic and triggered location. A location report sent by the UE to the wireless network may contain a second codeword, indicating a type of triggered or periodic event detected by the UE, which may be conveyed by the wireless network to the external client without interpretation. Codewords may enable more flexibility for periodic and triggered location without impacting wireless networks. Other aspects of the periodic and triggered location, however, provided by the external client may be visible to these wireless network entities, such as a required QoS for a location estimate for a UE, a maximum duration of location reporting and/or a maximum number of location reports.

In one aspect, a method for supporting periodic and triggered location by a user equipment (UE) includes receiving a request for a periodic and triggered location from a wireless network, the request for the periodic and triggered location comprising a first codeword, the request for the periodic and triggered location and the first codeword received by the wireless network from an external client; determining a type of periodic and triggered location event based on the first codeword; detecting the type of periodic and triggered location event; and sending a location report to the wireless network in response to detecting the type of periodic and triggered location event, wherein the location report is transmitted to the external client by the wireless network.

In one aspect, a user equipment (UE) capable of supporting periodic and triggered location includes a wireless transceiver configured to wirelessly communicate with a wireless network; memory configured to store codewords; and at least one processor coupled to the wireless transceiver and the memory and configured to receive via the wireless transceiver a request for a periodic and triggered location from the wireless network, the request for the periodic and triggered location comprising a first codeword, the request for the periodic and triggered location and the first codeword received by the wireless network from an external client, determine a type of periodic and triggered location event based on the first codeword, detect the type of periodic and triggered location event, and send via the wireless transceiver a location report to the wireless network in response to detecting the type of periodic and triggered location event, wherein the location report is transmitted to the external client by the wireless network.

In one aspect, a user equipment (UE) capable of supporting periodic and triggered location includes means for receiving a request for a periodic and triggered location from a wireless network, the request for the periodic and triggered location comprising a first codeword, the request for the periodic and triggered location and the first codeword received by the wireless network from an external client; means for determining a type of periodic and triggered location event based on the first codeword; means for detecting the type of periodic and triggered location event; and means for sending a location report to the wireless network in response to detecting the type of periodic and triggered location event, wherein the location report is transmitted to the external client by the wireless network.

In one aspect, a non-transitory storage medium including program code stored thereon, the program code is operable to cause at least one processor in a user equipment (UE) support periodic and triggered location by the UE includes program code to receive a request for a periodic and triggered location from a wireless network, the request for the periodic and triggered location comprising a first codeword, the request for the periodic and triggered location and the first codeword received by the wireless network from an external client; program code to determine a type of periodic and triggered location event based on the first codeword;

program code to detect the type of periodic and triggered location event; and program code to send a location report to the wireless network in response to detecting the type of periodic and triggered location event, wherein the location report is transmitted to the external client by the wireless network.

In one aspect, a method for supporting periodic and triggered location of a user equipment (UE) by a first entity in a wireless network includes: receiving a request for a periodic and triggered location for the UE from a second entity, the request for the periodic and triggered location comprising a first codeword, wherein the first codeword identifies a type of periodic and triggered location event, wherein the request for the periodic and triggered location and the first codeword are received by the wireless network from an external client, wherein the request for the periodic and triggered location and the first codeword are sent to the UE by the wireless network; transmitting the request for the periodic and triggered location to a third entity without interpreting the first codeword; receiving a location report from a fourth entity, wherein the location report is sent in response to a detection of the type of periodic and triggered location event by the UE; and sending the location report to a fifth entity.

In one aspect, a first entity in a wireless network capable of supporting periodic and triggered location of a user equipment (UE) including an external interface transceiver configured to wirelessly communicate with the wireless network; memory containing executable code; and at least one processor coupled to the external interface and the memory and configured by the executable code to receive via the external interface a request for a periodic and triggered location for the UE from a second entity, the request for the periodic and triggered location comprising a first codeword, wherein the first codeword identifies a type of periodic and triggered location event, wherein the request for the periodic and triggered location and the first codeword are received by the wireless network from an external client, wherein the request for the periodic and triggered location and the first codeword are sent to the UE by the wireless network, transmit via the external interface the request for the periodic and triggered location to a third entity without interpreting the first codeword, receive via the external interface a location report from a fourth entity, wherein the location report is sent in response to a detection of the type of periodic and triggered location event by the UE, and send via the external interface the location report to a fifth entity.

In one aspect, a first entity in a wireless network capable of supporting periodic and triggered location of a user equipment (UE) includes means for receiving a request for a periodic and triggered location for the UE from a second entity, the request for the periodic and triggered location comprising a first codeword, wherein the first codeword identifies a type of periodic and triggered location event, wherein the request for the periodic and triggered location and the first codeword are received by the wireless network from an external client, wherein the request for the periodic and triggered location and the first codeword are sent to the UE by the wireless network; means for transmitting the request for the periodic and triggered location to a third entity without interpreting the first codeword; means for receiving a location report from a fourth entity, wherein the location report is sent in response to a detection of the type of periodic and triggered location event by the UE; and means for sending the location report to a fifth entity.

In one aspect, a non-transitory storage medium including program code stored thereon, the program code is operable to cause at least one processor in a first entity in a wireless network support periodic and triggered location of a user equipment (UE) includes program code to receive a request for a periodic and triggered location for the UE from a second entity, the request for the periodic and triggered location comprising a first codeword, wherein the first codeword identifies a type of periodic and triggered location event, wherein the request for the periodic and triggered location and the first codeword are received by the wireless network from an external client, wherein the request for the periodic and triggered location and the first codeword are sent to the UE by the wireless network; program code to transmit the request for the periodic and triggered location to a third entity without interpreting the first codeword; program code to receive a location report from a fourth entity, wherein the location report is sent in response to a detection of the type of periodic and triggered location event by the UE; and program code to send the location report to a fifth entity.

BRIEF DESCRIPTION OF THE DRAWINGS

An understanding of the nature and advantages of various embodiments may be realized by reference to the following figures.

Figure 1:
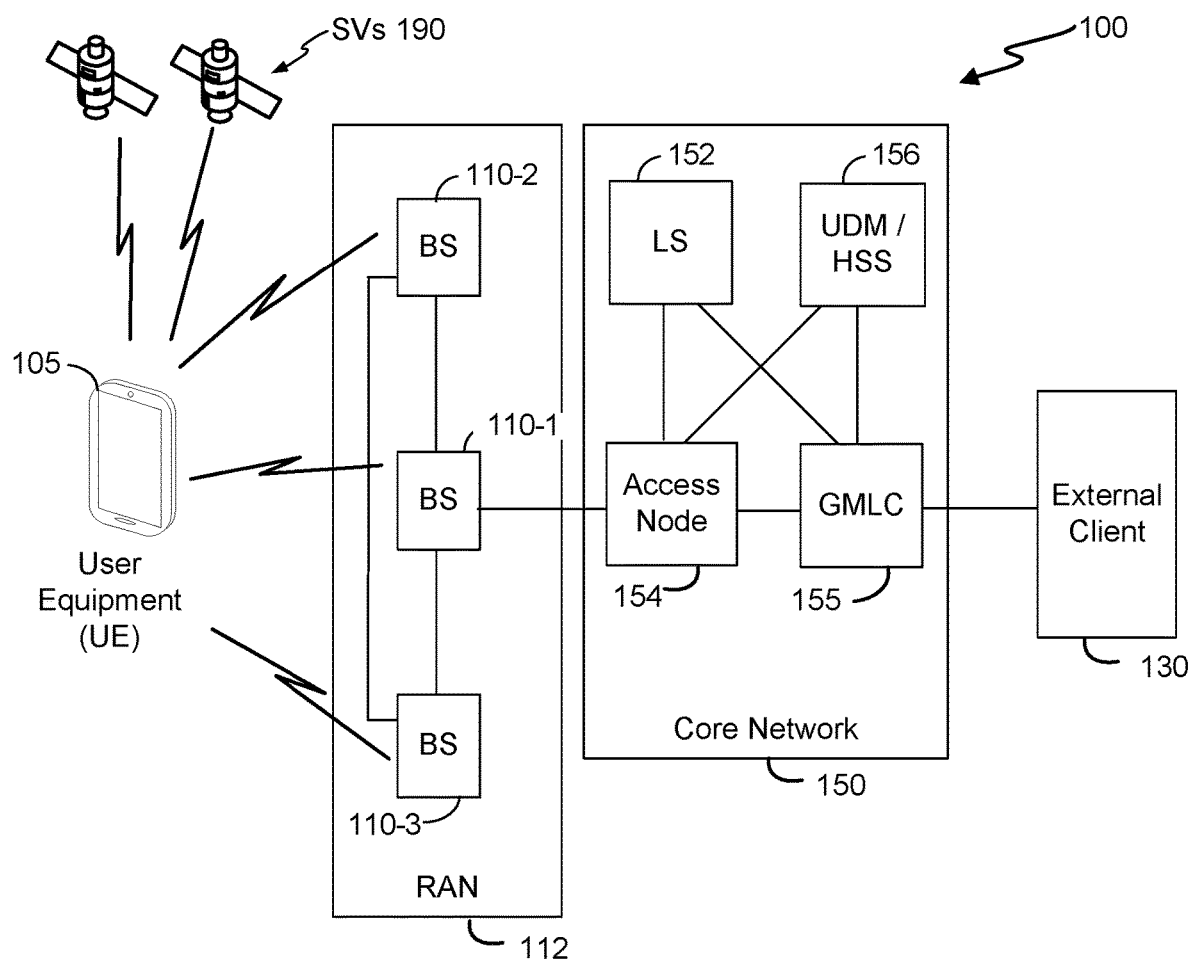
FIG. 1 shows a diagram of a communication system supporting LTE (4G) or 5G wireless access for a user equipment (UE).

Like reference numbers and symbols in the various figures indicate like elements, in accordance with certain example implementations. In addition, multiple instances of an element may be indicated by following a first number for the element with a hyphen and a second number. For example, multiple instances of an element 110 may be indicated as 110-1, 110-2, 110-3 etc. When referring to such an element using only the first number, any instance of the element is to be understood (e.g. element 110 in the previous example would refer to any of elements 110-1, 110-2 and 110-3).

DETAILED DESCRIPTION

Periodic and triggered location of a target UE may comprise determining when a certain trigger event has occurred for the target UE and then reporting the occurrence of the trigger event and, typically, an estimate of the current location of the target UE to an external client. For solutions in which support for a periodic and triggered location is provided explicitly by a wireless network using a Control Plane (CP) location solution (in which entities in a wireless network may interact using interfaces and protocols designed for signaling rather than data), the external client may instigate the periodic and triggered location of the target UE by sending a request to an entity in the wireless network (e.g. a Gateway Mobile Location Center (GMLC)). This entity may then transfer the request to one or more other entities in the wireless network (e.g. a Mobility Management Entity (MME) in the case of a wireless network providing LTE wireless access to the UE). These other entities may then help coordinate the detection and reporting of trigger events and obtaining associated location estimates. Typically, the target UE is also involved in the periodic and triggered location procedure. For example, for the CP location solution defined by the Third Generation Partnership Project (3GPP) for wireless networks supporting LTE, the UE would monitor for trigger events and instigate event reporting and any location determination when a trigger event is detected.

Periodic and triggered location may also be referred to as "periodic or triggered location" or simply as "triggered location". Trigger events (also referred to as "events" or "location events") can include periodic events (e.g. location of a UE at fixed periodic intervals), events based on entering, being inside or leaving a predefined geographic area, or events based on a UE moving by more than some threshold straight line distance from a previous location for the UE. However, the trigger events typically need to be precisely defined and visible to entities in a wireless network (e.g. a GMLC and/or MME) that support a periodic and triggered location when a CP location solution is used. For example, an external client may include an identification of a required trigger event (or trigger events) and associated parameters (e.g. a definition of a geographic area for an area trigger event or a definition of a straight line distance threshold for a motion trigger event) along with a request for periodic and triggered location sent to a GMLC in a wireless network. The GMLC may verify the parameters (e.g. verify that the encoding and values for the parameters match what is defined or allowed for a periodic and triggered location) and may then pass on the trigger event identification and associated parameters to another entity (e.g. an MME) which may later transfer the trigger event identification and associated parameters to the target UE. This method of support may significantly limit the types of trigger event which can be supported and may add impacts to entities in a wireless network to support existing, and new types of, trigger events and associated parameters.

To support periodic and triggered location of a target UE by an external client in a more flexible manner and with less impact to a wireless network, a method is described here that includes two parts. With a first part, support for periodic and triggered location is focused on the target UE, with the target UE detecting when a trigger event has occurred and instigating reporting of a trigger event and location of the target UE when a trigger event is detected. The notification of the trigger event and any location of the target UE are subsequently sent by the wireless network to the external client which instigated the periodic and triggered location.

In the second part, which is referred to herein as "codeword based reporting", support by the network for all or for certain types of trigger events is removed. Instead, an external client may request periodic or triggered location of a target UE according to trigger criteria that are not visible to entities (e.g. an AMF, LMF, VGMLC, HGMLC, or E-SMLC) within a wireless network. For example, an external client may include a first codeword (also referred to herein as a "transparent container") in a periodic and triggered location request for a target UE, which is subsequently sent to the target UE by an element in the wireless network (e.g. an MME, AMF or LMF) as part of a request for periodic and triggered location. The first codeword may be meaningful to the target UE (e.g. may be configured in advance in the target UE) and may indicate one or more types of triggered and/or periodic event to be detected and reported by the target UE. The particular type(s) of triggered and/or periodic event may not be known to entities (e.g. an AMF, LMF, VGMLC, HGMLC, or E-SMLC) in the wireless network that help coordinate the periodic and triggered location.

An advantage of indicating the particular type of trigger event(s) to be reported only to a target UE and not to other entities in a wireless network is that new types of trigger events may be defined and supported that require impacts only to an external client and a target UE and not to the other entities in a wireless network such as an MME, AMF, LMF or GMLC. For example, new impacts to a target UE may be downloaded via a data transfer to the UE, or may be included in the UE as part of an App, and may later be changed by another download or a modification to the App. This may enable greater flexibility in triggered and periodic location reporting.

Examples of new types of triggering events that could be supported using codeword based reporting include: (i) events based on a time of day or day of week (e.g. such a reporting a location of a UE at particular times of day and/or during particular days in a week); (ii) events based on a current location of a UE such as reporting a location of the UE at frequent intervals (e.g. every 5 minutes) when the UE is in an area of interest versus reporting a location of the UE less frequently (e.g. every 2 hours) when the UE is not in an area of interest; (iii) events based on a current movement of a UE such as reporting a location of a UE frequently (e.g. every 10 minutes) when the UE is moving and not reporting a location of the UE when the UE is stationary; (iv) events based on an activity of a UE such as reporting a location of the UE whenever a UE originates or receives a call; and (v) events based on a user instigated trigger such as reporting a location of a UE whenever a user of the UE determines a location of interest and indicates this to the UE.

A first codeword that is provided by an external client for location based reporting, and that is transferred to a target UE, may be encoded in different ways such as using a single value, multiple values, a bit string, an octet string, a character string, an integer, a character etc. Moreover, in some embodiments, the first codeword may be absent and instead the presence of a periodic or triggered location request itself may indicate a particular type of triggered or periodic location reporting (e.g. based in part also on a current time of day, day of week, current location of a target UE and/or identity of the external client). In some embodiments, a UE may include a second codeword (or second transparent container), different to the first codeword, in any report of a trigger event sent to an external client. For example, when a target UE detects a trigger event, the target UE may determine a second codeword which identifies the trigger event detected and the target UE may then include the second codeword in an event report for the detected trigger event which is sent by the target UE to the external client via the wireless network (e.g. via an MME and a GMLC in the wireless network). Similar to the first codeword, the second codeword may be encoded in different ways such as using a single value, multiple values, a bit string, an octet string, a character string, an integer, a character etc. The second codeword may also be based on the first codeword. For example, the trigger event identified by the second codeword and the encoding of the second codeword may be defined by the first codeword.

A first codeword that is provided by an external client for location based reporting may be standardized (e.g. by 3GPP), proprietary or partially standardized and partially proprietary (referred to herein as a hybrid definition). As an example of a hybrid definition, 3GPP might define a high level structure for a codeword that includes an ID or Type field having a set of standardized values and another set of proprietary values, and with the remainder of the container defined by 3GPP only for the set of standardized values. In contrast, each proprietary value may be associated with and accompanied by a proprietary definition of the rest of the codeword. Similarly, a second codeword that is returned by a UE to an external client may also be standardized by 3GPP, proprietary or partially standardized and partially proprietary.

In some embodiments, the first codeword may be transferred from the external client to the target UE via the wireless network without any significant change. For example, the first codeword sent to the UE in a request for periodic or triggered location by the wireless network may be identical to the codeword sent to the wireless network by the external client in the initial request for the periodic and triggered location in terms of semantics, though may be encoded differently. For example, if the first codeword sent by the external client comprises an integer, the first codeword sent to the UE may also comprise an integer with the same value, although the encoding may be different (e.g. with a decimal encoded value sent by the external client and with a binary encoded value sent to the UE). The same restriction may apply to transfer of a second codeword from the UE to the external client as part of sending an event report for a detected trigger event.

In some embodiments, the wireless network (e.g. a GMLC) may receive or determine an identity (ID) for the external client and may validate the ID. The wireless network (e.g. an AMF, MME or LMF) may then include the validated external client ID along with the first codeword in the request for periodic and triggered location sent to the UE. In these embodiments, the UE may be configured with values for one or more codewords which are applicable only to the particular external client identified by the external client ID. The UE may then verify that the provided external client ID matches an ID for the external client configured in the UE, and may then process (e.g. interpret) the first codeword based only on codewords configured in the UE for this external client. This may avoid the UE mistaking a codeword sent by the external client with a codeword configured in the UE for a different external client, which may avoid incorrect trigger event detection and incorrect trigger event reporting by the UE.

Although the first and second codewords described above may be transported without interpretation or significant alteration between a UE and external client to reduce impacts to entities in a wireless network, certain other information related to a periodic or triggered location may be visible to entities in a wireless network. For example, some aspects of a periodic and triggered location may be provided by an external client as common parameters which are visible to entities in a wireless network (e.g. such as a GMLC, MME, AMF, LMF and/or E-SMLC) as well as to a UE. The common parameters (visible to entities in the wireless network and the UE) may include: (i) conditions for terminating a periodic and triggered location session (e.g. a maximum duration and/or a maximum number of event reports); (ii) whether a location estimate is required for each event report; (iii) a maximum interval and/or a minimum interval between consecutive event reports from a UE; (iv) a maximum and/or a minimum event sampling interval for a target UE; and/or (v) a required QoS for a location estimate for the target UE. The common parameters may enable entities in a wireless network (e.g. a GMLC, MME, AMF, LMF or E-SMLC) to estimate resource usage in advance for a periodic and triggered location request received from an external client and to decide whether to accept or reject the request (e.g. based on an expected resource usage). The common parameters may also enable better coordination and support of the periodic and triggered location by entities in the wireless network without restricting the types of trigger event which can be reported or adding unnecessary impacts to these entities.

It is noted that the terms identity, identifier and identification are used synonymously herein with the abbreviation "ID". It is further noted that the terms "target UE" and "UE" are used interchangeably herein, with the term "target UE" generally indicating a UE which is the target of a location request from an external client.

FIG. 1 shows a simplified diagram of a communication system 100, according to an embodiment. The communication system 100 may be configured to transfer a codeword provided by an external client 130 to a wireless network along with a request for periodic and triggered location. The codeword may define one or more types of triggering event, and the communication system 100 may be further configured to transfer the codeword along with the request for periodic and triggered location to the UE 105 without the entities in the wireless network interpreting or processing the codeword. The communication system 100 is illustrated as including a UE 105, and components of the wireless network, comprising Radio Access Network (RAN) 112 that includes a number of base stations 110-1, 110-2 and 110-3 (sometimes collectively and generically referred to herein as BS 110), a core network 150, and the external client 130. The communication system 100 may further utilize information from satellite vehicles (SVs) 190 for a Global Navigation Satellite System (GNSS) like the Global Positioning System (GPS), GLONASS, Galileo, Beidou or some other local or regional Satellite Positioning System (SPS) such as IRNSS, EGNOS or WAAS. The Additional components of the communication system 100 are described below. The communication system 100 may include additional or alternative components.

It is noted that FIG. 1 provides only a generalized illustration of a communication system and various components that may use a codeword, as described herein. Specific communications systems that may be described by the communication system 100 include, but are not limited to a Long Term Evolution (LTE) network, a Fifth Generation (5G) network, Global System for Mobile communication (GSM), Code Division Multiple Access (CDMA), Wideband CDMA (WCDMA), and IEEE 802.11 WiFi (also referred to as Wi-Fi) etc. It should be further understood that FIG. 1 provides only a generalized illustration of various components, any or all of which may be utilized as appropriate, and each of which may be duplicated or omitted as necessary. Specifically, although only one UE 105 is illustrated, it will be understood that many UEs (e.g., hundreds, thousands, millions, etc.) may utilize the communication system 100. Similarly, the communication system 100 may include a larger or smaller number of SVs 190, BSs 110, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 105, as used herein, may be an electronic device and may be referred to as a device, a mobile device, a wireless device, a mobile terminal, a terminal, a wireless terminal, a mobile station (MS), a Secure User Plane Location (SUPL) Enabled Terminal (SET), or by some other name. Moreover, UE 105 may correspond to a cellphone, smartphone, laptop, tablet, PDA, tracking device or some other portable or moveable device. In some cases, a UE 105 may be part of some other entity—e.g. may be a chipset supporting a modem that is integrated into some larger mobile entity such as a vehicle, drone, package, shipment, robotic device etc. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi, Bluetooth® (BT), Worldwide Interoperability for Microwave Access (WiMAX), 5G New Radio (NR), etc. The UE 105 may also support wireless communication using a Wireless Local Area Network (WLAN) which may connect to other networks (e.g. the Internet) using a Digital Subscriber Line (DSL) or packet cable for example. The use of one or more of these RATs may allow the UE 105 to communicate with an external client 130 (via elements not shown in network 150, or via a Gateway Mobile Location Center (GMLC) 155) and/or may allow the external client 130 to receive location information regarding the UE 105 (e.g., via the network 150).

The UE 105 may include a single entity or may include multiple entities such as in a personal area network where a user may employ audio, video and/or data I/O devices and/or body sensors and a separate wireline or wireless modem. An estimate of a location of the UE 105 may be referred to as a location, location estimate, location fix, fix, position, position estimate or position fix, and may be geodetic, thus providing location coordinates for the UE 105 (e.g., latitude and longitude) which may or may not include an altitude component (e.g., height above sea level, height above or depth below ground level, floor level or basement level). Alternatively, a location of the UE 105 may be expressed as a civic location (e.g., as a postal address or the designation of some point or small area in a building such as a particular room or floor). A location of the UE 105 may also be expressed as an area or volume (defined either geodetically or in civic form) within which the UE 105 is expected to be located with some probability or confidence level (e.g., 67%, 95%, etc.) A location of the UE 105 may further be a relative location comprising, for example, a distance and direction or relative X, Y (and Z) coordinates defined relative to some origin at a known location or some previous location of the UE 105, which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local x, y, and possibly z coordinates and then, if needed, convert the local coordinates into absolute ones (e.g. for latitude, longitude and altitude above or below mean sea level).

Base stations (BSs) 110 in the RAN 112 shown in FIG. 1 may comprise, e.g., evolved Node Bs (eNodeBs), also referred to as an eNBs, in the case of an LTE network, or New Radio (NR) NodeBs, also referred to as gNBs, in the case of a 5G network. Pairs of base stations 110 in RAN 112 may be connected to one another—e.g. directly as shown in FIG. 1 or indirectly via other base stations 110. Access to the core network 150 is provided to UE 105 via wireless communication between the UE 105 and one or more of the base stations 110, which may provide wireless communication access to the core network 150 on behalf of the UE 105 using LTE, NR, etc. In FIG. 1, the serving base station for UE 105 is assumed to be base station 110-1, although other base stations (e.g. base stations 110-2 and/or 110-3) may act as a serving base station if UE 105 moves to another location or may act as a secondary base station to provide additional throughout and bandwidth to UE 105. Some base stations 110 in FIG. 1 (e.g. base stations 110-2 or 110-3) may be configured to function as positioning-only beacons which may transmit signals (e.g. a Positioning Reference Signal (PRS)) to assist positioning of UE 105 but may not receive signals from UE 105 or from other UEs.

As noted, FIG. 1 depicts nodes that are configured to communicate using appropriate communications protocols, such as 5G communication protocols, or other communication protocols, such as, for example, LTE protocols. Such nodes, configured to communicate using different protocols, may be controlled, at least in part, by the core network 150. Thus, the RAN 112 may include any combination of base stations 110, including gNBs supporting NR access, evolved Node Bs (eNBs) supporting LTE access, or other types of base stations or access points (APs). As an example, RAN 112 may include one or more next generation eNBs (ng-eNBs) which provide LTE wireless access to UE 105 and may connect to gNBs and/or other ng-eNBs in RAN 112.

Base stations 110 in RAN 112 may connect to and/or communicate with an Access Node 154 in core network 150, which may be, e.g., a Mobility Management Entity (MME) in the case eNBs for an LTE network, or may be an Access and Mobility Management Function (AMF) in the case of gNBs and/or ng-eNBs for a 5G network. The Access Node 154 may communicate with a Location Server (LS) 152. The Location Server 152 may be, e.g., an Enhanced Serving Mobile Location Center (E-SMLC) in the case of an LTE network, a Location Management Function (LMF) in the case of a 5G network, or Secure User Plane Location (SUPL) Location Platform (SLP) in either an LTE network or a 5G network. The Access Node (AN) 154 may support attachment, registration and/or mobility of the UE 105, including cell change and handover and may participate in supporting a signaling connection to the UE 105 and helping to establish and release data connections for UE 105 such as Protocol Data Unit (PDU) sessions for 5G access. For a core network 150 supporting 5G NR wireless access or LTE access via ng-eNBs, AN 154 may correspond to an AMF and LS 152 may then correspond to an LMF. For a core network 150 supporting LTE wireless access via eNBs, AN 154 may correspond to an MME and LS 152 may then correspond to an E-SMLC.

The Location Server 152 may support positioning of the UE 105 when UE 105 accesses the RAN 112 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (ECID), round trip signal propagation time (RTT), angle of arrival (AOA), angle of departure (AOD), WLAN positioning and/or other position methods. The Location Server 152 may also process location services requests for the UE 105, e.g., received from the Access Node 154. It is noted that in some embodiments, at least part of the positioning functionality (including derivation of the location of UE 105) may be performed at the UE 105 (e.g., using signal measurements obtained by UE 105 for signals transmitted by wireless nodes such as base stations 110, and assistance data provided to the UE 105, e.g. by Location Server 152 or via broadcast from one or more BSs 110).

The GMLC 155 may support a single (e.g. non-triggered) location request for the UE 105 received from the external client 130 or from a Home GMLC (HGMLC) in a separate home network for UE 105 (not shown in FIG. 1), and may forward such a location request to the Access Node 154 for forwarding by the Access Node 154 to the Location Server 152 or may forward the location request directly to the Location Server 152. A location response from the Location Server 152 (e.g. containing a location estimate for the UE 105) may be similarly returned to GMLC 155 either directly or via the Access Node 154, and the GMLC 155 may then return the location response (e.g., containing the location estimate) to the external client 130 or to an HGMLC. The GMLC 155 is shown connected to both the Access Node 154 and Location Server 152 in FIG. 1, but only one of these connections may be supported in some implementations.

As further illustrated in FIG. 1, a Unified Data Management (UDM) and/or a Home Subscriber Server (HSS) 156 may be connected to the GMLC 155 and to the AN 154. The UDM/HSS 156 is a central database that contains user-related and subscription-related information for UE 105 and may perform the following functions: UE authentication, UE identification, access authorization, registration and mobility management, subscription management and Short Message Service management. FIG. 1 shows UDM/HSS 156 as being part of core network 150 which may be applicable when core network 150 is a home network for UE 105. When core network 150 acts as a visited but not home network for UE 105, UDM/HSS 156 may be in a separate home network for UE 105 which is different to core network 150 and not shown in FIG. 1. When RAN 112 provides LTE wireless access to UE 105 via eNBs, UDM/HSS 156 may comprise only an HSS but not a UDM. When RAN 112 provides 5G NR wireless access to UE 105 or LTE wireless access via ng-eNBs, UDM/HSS 156 may comprise a UDM but not an HSS.

It should be understood that additional components, not pertinent to the use of a codeword, as described herein, may be used with the communication system 100.

The Location Server 152 and the base stations 110 may communicate using an appropriate protocol. For example, an LTE Positioning Protocol A (LPPa) defined in 3GPP Technical Specification (TS) 36.455 or a New Radio Position Protocol A (NRPPa) defined in 3GPP TS 38.455 may be used. NRPPa and LPPa may be similar, with NRPPa or LPPa messages being transferred between the base stations 110 and the Location Server 152 via the Access Node 154. Moreover, the Location Server 152 and UE 105 may also communicate using appropriate protocols, such as the LTE Positioning Protocol (LPP) defined in 3GPP TS 36.355, where LPP messages are transferred inside NAS transport messages between the UE 105 and the Access Node 154 via a serving base station 110-1 for UE 105, and where Access Node 154 relays the LPP messages to and from Location Server 152. For example, in a 5G network, LPP messages may be transferred between the Location Server 152 and the Access Node 154 using service operations based on the HyperText Transfer Protocol (HTTP) and may be transferred between the Access Node 154 and the UE 105 using a 5G Non-Access Stratum (NAS) protocol. The LPP protocol may be used to support positioning of UE 105 using UE assisted and/or UE based position methods such as A-GNSS, RTK, OTDOA, ECID, RTT and/or WLAN positioning. With UE assisted positioning, UE 105 may obtain location measurements and transfer the measurements to LS 152 (e.g. using LPP) with LS 152 then obtaining a location estimate for UE 105 based on the location measurements. With UE based positioning, both operations (location measurement and location determination) may be performed by UE 105.

The LPPa and NRPPa protocols may be used to support positioning of UE 105 using network based position methods such as ECID (e.g. when used with measurements obtained by a base station 110 of signals transmitted by UE 105) and/or may be used by Location Server 152 to obtain location related information from base stations 110. For example, location related information provided by the base stations 110 to the Location Server 152 using NRPPa or LPPa may include timing and configuration information for Positioning Reference Signal (PRS) transmission from base stations 110 and/or location coordinates of the base stations 110. The Location Server 152 can then provide some or all of this location related information to the UE 105 as assistance data in an LPP message via the RAN 112 and the core network 150.

A message, such as an LPP message, sent from the Location Server 152 to the UE 105 may instruct the UE 105 to do any of a variety of things, depending on desired functionality. For example, the message could contain an instruction for the UE 105 to obtain measurements for GNSS (or A-GNSS), WLAN, and/or OTDOA (or some other position method). In the case of OTDOA, the message may instruct the UE 105 to obtain one or more measurements (e.g. Reference Signal Time Difference (RSTD) measurements) of PRS signals transmitted within particular cells supported by particular base stations 110. The UE 105 may send the measurements back to the Location Server 152 in, e.g., an LPP message (e.g. inside a 5G NAS message) via the serving base station 110-1 and the Access Node 154.

In some embodiments, LPP may be augmented by or replaced by an NR positioning protocol (NPP or NRPP) which supports position methods such as OTDOA, RTT and ECID for NR radio access. For example, an LPP message may contain an embedded NPP message or may be replaced by an NPP message.

The GMLC 155 may provide location access to UE 105 on behalf of external clients such as external client 130. The GMLC 155 or other entities in the core network 150 may be connected to external client 130, e.g., through another network, such as the Internet. In some cases, a Home GMLC (HGMLC) located in another Public Land Mobile Network (PLMN) (not shown in FIG. 1) may be connected to GMLC 155 (e.g., via the Internet) in order to provide location access to UE 105 on behalf of external clients connected to the HGMLC. In these cases, GMLC 155 may function as a Visited GMLC (VGMLC) for UE 105. In other cases (e.g. where core network 150 is a home network for UE 105), GMLC 155 may function as both an HGMLC and a VGMLC for UE 105. The GMLC 155, and any other HGMLC, if present, may support location access to UE 105 using one or more of the 3GPP CP solutions defined in 3GPP TS 23.271, in 3GPP TS 23.501 and 3GPP TS 23.502 and in other 3GPP TSs.

As noted, while the communication system 100 is described generically, the communication system 100 may be implemented to support particular communication technologies, such as NR, GSM, WCDMA, LTE, WiFi, etc., that are used for supporting and interacting with mobile devices such as the UE 105 (e.g., to implement voice, data, positioning, and other functionalities). In some such embodiments, the core network 150 may be configured to control RANs, such as: (i) an Evolved Universal Terrestrial Radio Access Network (E-UTRAN) comprising one or more evolved Node Bs (eNBs); (ii) a Next Generation RAN (NG-RAN) comprising one or more gNBs and/or ng-eNBs; and/or (iii) one or more WLANs comprising WiFi access points (APs). For example, in an Evolved Packet System (EPS) defined by 3GPP to support LTE access: the UE 105 may access the EPS; the RAN 112 may be an E-UTRAN containing BSs 110 which comprise eNBs; and the core network 150 may be a Evolved Packet Core (EPC) comprising a Mobility Management Entity (MME) as the Access Node 154, an Enhanced Serving Mobile Location Center (E-SMLC) as the Location Server 152 and a VGMLC and/or HGMLC that may be similar or identical to the GMLC 155. In such an EPS, the E-SMLC may use LPPa to send and receive location information to and from the eNBs in the E-UTRAN and may use LPP to support positioning of UE 105.

In another example, in a 5G System (5GS) defined by 3GPP to support 5G NR wireless access: the UE 105 may access the 5GS; the RAN 112 may be an NG-RAN containing BSs 110 which comprise gNBs and/or ng-eNBs; and the core network 150 may be a 5G Core (5GCN) comprising an AMF as the Access Node 154, an LMF as the Location Server 152 and a VGMLC and/or HGMLC that may be similar or identical to the GMLC 155. In such a 5GS, the LMF may use NRPPa to send and receive location information to and from the gNBs and/or ng-eNBs in the NG-RAN and may use LPP and/or NPP or NRPP to support positioning of UE 105.

Figure 2:
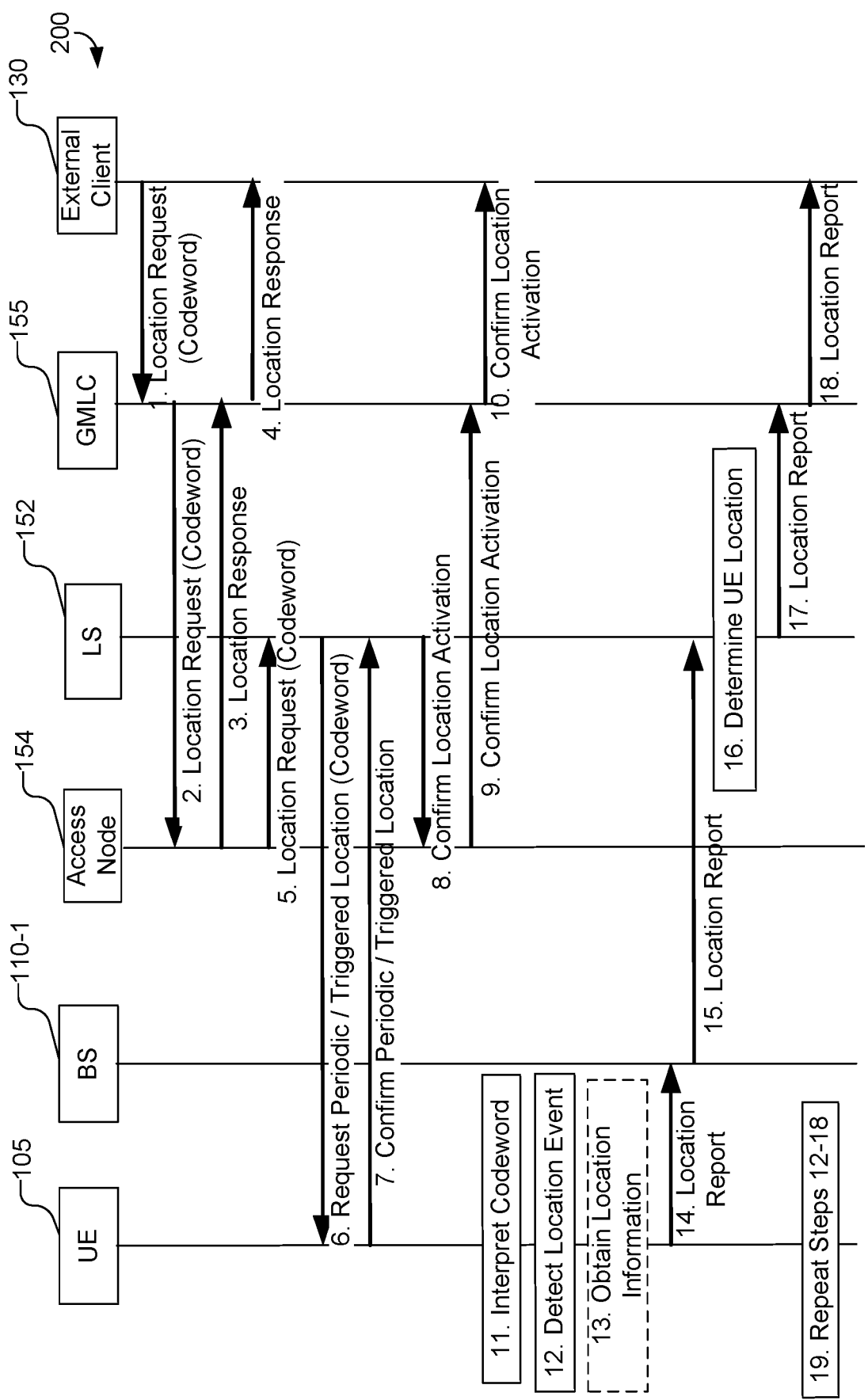
FIGS. 2, 3A and 3B show signaling flows that illustrate periodic and triggered location for a user equipment (UE) using a codeword.

FIG. 2 shows a signaling flow 200 for a Mobile Terminated Location Request (MT-LR) procedure for a UE 105 to support periodic and triggered location using a codeword provided by an external client 130 and transmitted to the UE 105 through the wireless network shown in FIG. 1 (comprising RAN 112 and core network 150). Signaling flow 200 may be applicable when RAN 112 and core network 150 correspond to a 5G network (e.g. where RAN 112 comprises an NG-RAN and core network 150 comprises a 5GCN). In such a case: BS 110-1 may be a gNB, ng-eNB or a WLAN; AN 154 may be an AMF; and LS 152 may be an LMF.

At stage 1 in FIG. 2, external client 130 sends a location request for periodic or triggered location of UE 105 to GMLC 155. The location request may be sent directly to GMLC 155 by external client 130 at stage 1—e.g. when GMLC 155 is an HGMLC for UE 105 or when GMLC 155 is a VGMLC with a direct connection to external client 130. The location request may instead be sent indirectly to GMLC 155 at stage 1 by external client 130 via an HGMLC for UE 105 (not shown in FIG. 2), where external client 130 sends the location request to the HGLMC and where the HGMLC forwards the location request to GMLC 155—e.g. which may occur when GMLC 155 is a VGMLC. The location request may include an identity for the external client 130 which may be verified (e.g., authenticated by GMLC 155). The location request may include a codeword that provides trigger criteria for the UE 105, but the trigger criteria may not be visible to other entities in the wireless network including the GMLC 155, Location Server 152, and Access Node 154. The codeword may be meaningful to UE 105 (e.g. the codeword may be configured in advance in UE 105) and may indicate a particular type, or particular types, of triggered and/or periodic event to be detected and reported by UE 105. For example, the codeword may provide the type of location (or location event or trigger event) reporting being requested. Examples of location events or trigger events may include: entering into an area; leaving from an area; being inside an area; periodic events; motion based events; events based on a time of day or day of week (e.g. such as reporting a location of UE 105 at particular times of day and/or particular days in a week); events based on a current location of UE 105, such as reporting a location of UE 105 at frequent intervals (e.g. every 5 minutes) when UE 105 is in an area of interest versus reporting a location of UE 105 less frequently (e.g. every 2 hours) when UE 105 is not in an area of interest; events based on a current movement of UE 105, such as reporting a location of UE 105 frequently (e.g. every 10 minutes) when UE 105 is moving and not reporting a location of UE 105 when UE 105 is stationary; events based on an activity of UE 105, such as reporting a location of UE 105 whenever UE 105 originates or receives a call; and events based on a user instigated trigger such as reporting a location of UE 105 whenever a user of UE 105 determines a location of interest and indicates this to UE 105.

In some examples, only one type of location reporting is requested at stage 1 (e.g. such as requesting reporting at stage 1 of periodic events but not area events or motion events). However, other examples may exist in which more than one type of locating reporting is requested (e.g. such as requesting at stage 1 reporting of both periodic events and motion events). For any type of reporting, the location request may include an identity for UE 105, e.g. a Mobile Station International Subscriber Directory Number (MSISDN), an International Mobile Subscriber Number (IMSI), a Generic Public Subscription Identifier (GPSI), or some other identity known to external client 130 and GMLC 155. For area event reporting, (e.g., entering into an area, leaving from an area or being inside an area), for example, details of the target area (e.g., a definition or identification of a geographic or civic target area), and whether the trigger event to be reported is the UE 105 being inside, entering into or leaving the target area may be defined by the codeword. For motion event reporting, the codeword may indicate a threshold linear distance of movement by UE 105 to trigger a motion event report. However, certain other parameters for the periodic and trigger location may be provided explicitly to GMLC 155, Location Server 152, and Access Node 154 as well as to UE 105 or may be provided only via the codeword. These other parameters may include a duration of reporting, a total number of reports, a minimum and/or a maximum time interval between successive event reports, a minimum and/or a maximum event sampling interval to be used by UE 105 at stage 12, whether location estimates may be included in event reports (and an associated location Quality of Service (QoS)), and/or whether only one location report is required or more than one. In some embodiments, the external client 130 may have received information for the location request from another entity (e.g., a user of external client 130) (not shown in FIG. 2). The codeword that is provided by the external client 130 at stage 1, and that is transferred to UE 105 at stage 6, may be encoded in different ways such as using a single value, multiple values, a bit string, an octet string, a character string, an integer, a character etc. Moreover, in some embodiments, the codeword may be absent and instead the presence of a periodic or triggered location request itself may indicate a particular type of triggered or periodic location reporting (e.g. based in part on a current time of day, day of week, current location of UE 105 and/or an identity for external client 130). As part of stage 1, GMLC 155 may verify that external client 130 is authorized to obtain a location of UE 105 (e.g. by querying UDM/HSS 156 for subscribed UE 105 privacy requirements).

At stage 2, the GMLC 155 transmits the location request with the codeword, the identity of the external client 130, and other parameters sent by the external client 130 at stage 1, to the serving AN 154 for UE 105. GMLC 155 may also query UDM/HSS 156 for the address of the serving AN 154 (not shown in FIG. 2) prior to sending the location request to serving AN 154 at stage 2 if GMLC 155 does not have the address of serving AN 154 already. GMLC 155 may also assign and include a GMLC reference identifier in the location request sent at stage 2 to enable GMLC 155 to correctly identify later responses (e.g. as received at stages 3, 9 and 17 and which include the GMLC reference identifier) as being associated with the location request received at stage 1.

At stage 3, the serving AN 154 sends a response to GMLC 155 confirming that the location request received at stage 2 can be supported. The GMLC 155 then returns the response to the external client 130 at stage 4.

At stage 5, the serving AN 154 waits until the UE 105 becomes reachable from RAN 112 if UE 105 is not currently reachable (e.g. is in extended discontinuous reception (eDRX) mode or in Power Saving Mode (PSM)). The serving AN 154 then select a suitable Location Server 152 and sends a location request for UE 105 to the selected LS 152. The request will typically include all the information received from GMLC 155 at stage 2 including the codeword, a GMLC 155 address or ID and the GMLC reference identifier and may also include capabilities of UE 105 such as whether UE 105 supports LPP. In one variant, the LS 152 may be selected by GMLC 155, in which case the location request sent at stage 2 includes an address or identifier for LS 152 and serving AN 154 sends the location request at stage 5 to this LS 152. In another variant (not shown in FIG. 2), prior to sending the location request at stage 5, serving AN 154 may verify user privacy requirements by sending a notification to UE 105 indicating the location request from external client 130 and UE 105 may interact with a user of UE 105 to determine if the location request is acceptable to the user and may return a response to serving AN 154 indicating whether the location request is accepted or denied. The remaining steps in FIG. 1 may then only be performed if the UE 105 indicates the location request is accepted.

At stage 6, the LS 152 sends a request to the target UE 105 (e.g. via serving AN 154 and base station 110-1) for periodic or triggered location of UE 105. The Location Server 152 includes all information needed to enable UE 105 to perform subsequent stages 11-14. This information includes the codeword, optionally the identity of the external client 130, the GMLC 155 address or ID, the GMLC reference identifier and other parameters for the triggered and periodic location request which are visible to GMLC 155, AN 154 and LS 152 (e.g. such as a duration of reporting, a total number of reports, a minimum and/or a maximum time interval between successive event reports, a minimum and/or maximum event sampling interval, whether location estimates may be included in event reports, a location QoS, and/or whether only one location report is required or more than one). The codeword sent at stage 6 may be identical to the codeword sent at stage 1 in terms of semantics, though may be encoded differently. For example, if the codeword sent at stage 1 comprises an integer, the codeword sent at stage 6 may also comprise an integer with the same value as at stage 1, although the encoding may be different (e.g. may be decimal at stage 1 and binary at stage 6). The request sent at stage 6 may also indicate the types of location information the UE 105 needs to obtain at stage 13 (e.g. such as particular position measurements for one or more position methods or a location estimate for UE 105) in the case that location estimates are needed for event reports, and/or an identity or identifier (ID) for the Location Server 152 (which may in some implementations be a default ID which identifies any LS 152 in core network 150). In some embodiments, the request sent at stage 6 may comprise or include a supplementary services message or a positioning protocol message (e.g. an LPP or NPP Request Location Information message).

At stage 7, UE 105 returns a response to Location Server 152 (e.g. via base station 110-1 and Access Node 154) confirming acceptance of the request at stage 6.

At stage 8, the LS 152 returns a response to the serving AN 154, confirming activation of periodic or triggered location in the target UE 105.

At stage 9, the serving AN returns the confirmation of activation of periodic or triggered location in the target UE 105 to the GMLC 155.

At stage 10, the GMLC 155 confirms activation of periodic or triggered location in the target UE 105 to the external client 130.

At stage 11, the UE 105 processes (e.g., interprets) the codeword to determine the type of periodic and triggered location event or events to be detected by UE 105 at stage 12. The processing (e.g. interpretation) of the codeword may be based on an identification for the external client 130 received at stage 6. For example, UE 105 may be configured with values for one or more codewords which are applicable only to one particular external client or to one particular group of external clients. If an identity for external client 130 matches an identity for an external client configured in UE 105, UE 105 may process (e.g. interpret) the codeword based only on codewords configured in UE 105 for external client 130. This may avoid UE 105 mistaking a codeword sent by external client 130 with a codeword configured in UE 105 for a different external client, which may avoid incorrect event reporting by UE at stage 14.

At stage 12, UE 105 monitors for the requested periodic or triggered location event or events and determines when an event has occurred. For trigger events which are not strictly periodic and not based only on a time of day or day of week, UE 105 may monitor for the requested event (or trigger event) at intervals which are (i) equal to or less than a maximum event sampling interval received at stage 6, and/or (ii) equal to or greater than a minimum event sampling interval received at stage 6. If no minimum and maximum event sampling intervals were received at stage 6 (e.g. due to not being included by external client 130 at stage 1 or by GMLC 155 as part of stage 2), UE 105 may use a default minimum and/or maximum event sampling interval. The use of minimum and/or maximum event sampling intervals at stage 12 may enable a limitation or reduction in UE 105 power and/or battery consumption for event monitoring and/or a limitation on a maximum delay in detecting an event. An event (or trigger event) may be detected by UE 105 when any of the following occur: (i) a requested trigger event not strictly time related (e.g. entering into an area, leaving from an area or being inside an area) has been detected by UE 105 and a minimum reporting interval (if included at stage 6) has elapsed since the last report at stage 14 (if this is not the first event report); (ii) a requested periodic or other strictly time related location event has occurred; or (iii) a maximum reporting interval has expired. An event trigger corresponding to alternative (iii) and its subsequent reporting as described further on in association with stages 14 to 18 may enable network entities (e.g. GMLC 155, Location Server 152 or Access Node 154) and external client 130 to determine whether periodic and triggered location reporting is still active in UE 105. After an event is detected by UE 105 at stage 12, UE 105 proceeds to stage 13.

At stage 13, UE 105 obtains any location information requested at stage 6 (e.g. visible cell IDs, downlink (DL) location measurements and/or a location estimate for UE 105) if location information was requested at stage 6. In some embodiments, the location information obtained at stage 13 may be based on (e.g. requested by) the codeword.

At stage 14, UE 105 selects a suitable serving cell and serving base station if UE 105 is currently in an Idle state and may request and obtain a signaling connection or signaling channel to this serving base station and possibly to elements in core network 150 such as AN 154. In this example, the serving base station for UE 105 is assumed to be base station 110-1, but could be another base station 110 different from base station 110-1. UE 105 then sends a location report to the serving base station 110-1 at stage 14, which may include any location information obtained at stage 13. Minimally, the identity of the serving base station 110-1 and/or the serving cell for UE 105 can serve as the location information and UE 105 obtains no additional location information at stage 13. The location report may also include one or more of an identity for UE 105, authentication information, an identifier (ID) for LS 152 (e.g. as received at stage 6), the type(s) of trigger event being reported (e.g., a trigger event or expiration of the maximum reporting interval), the GMLC 155 address or ID and the GMLC reference identifier, along with the location information sent to the serving base station 110-1 at stage 14. In some implementations, the type(s) of periodic and triggered location event interpreted from the codeword at stage 11 may include a plurality of trigger events and the UE 105 detects one of the plurality of trigger events at stage 12. The indication of the type(s) of event being reported (which may be included in the location report sent at stage 14) may comprise a second codeword different to but based on the codeword sent by the external client 130 at stage 1 that identifies the trigger event(s) (or one of the trigger events) that was detected by the UE at stage 12. In some embodiments, the location report sent at stage 14 may comprise or include a supplementary services message (e.g. Mobile Originated Location Request (MO-LR)) or a positioning protocol message (e.g. an LPP or NPP Provide Location Information (PLI) message) and may be transported inside a NAS transport message.

At stage 15, base station 110-1 sends the location report received at stage 14 (e.g. such as an MO-LR request or an LPP or NPP PLI message), or a NAS transport message received at stage 14 containing the location report, to the Location Server 152 indicated by the Location Server ID received at stage 14. The location report at stage 15 may typically be sent to the LS 152 via an AN 154, e.g. which may be a serving AN 154 for UE 105 and may be the same as or different to the serving AN 154 for stages 2-9. The AN 154 for stage 15 may authenticate the location report (or a NAS transport message containing the location report) as coming from UE 105, based on authentication information included in the location report or the NAS transport message.

At stage 16, Location Server 152 may identify the UE 105 using a UE ID included in the location report or provided by an AN 154 which forwards the location report to the LS 152 at stage 15. As part of stage 16, LS 152 may compute or verify a location estimate for UE 105 from any location information received at stage 15. In some implementations, LS 152 may obtain additional location information for UE 105 (not shown in FIG. 2) from UE 105 (e.g. using LPP) and/or from RAN 112 (e.g. from BS 110-1 and using NRPPa) and may use this additional location information to compute or verify a location estimate for UE 105 at stage 16.

At stage 17, Location Server 152 forwards the UE 105 location estimate and/or an event report (e.g., which may comprise the second codeword) to the GMLC 155, which may be identified from any GMLC 155 address or ID received at stage 15 or any GMLC 155 address or ID stored by Location Server 152 following stage 5.

At stage 18, the GMLC 155 forwards the UE 105 location estimate and/or an event report (e.g., which may comprise the second codeword) to the external client 130.

At stage 19, UE 105 initiates a repetition of stages 12-18 for further periodic or trigger events and may cease when a maximum duration or maximum number of event reports has been reached.

In one variant of signaling flow 200, GMLC 155 may send the location request at stage 2 directly to LS 152 rather than to AN 154. In this variant, stages 5 and 8 may not occur and the messages for stages 3 and 9 may be sent by LS 152 rather than by AN 154. In addition, in this variant, the actions previously described for serving AN 154, that are performed prior to or as part of stage 5, regarding waiting until UE 105 becomes reachable from RAN 112 and verifying user privacy requirements by sending a notification to UE 105, may be performed by LS 152 rather than by AN 154.

Figure 3A:
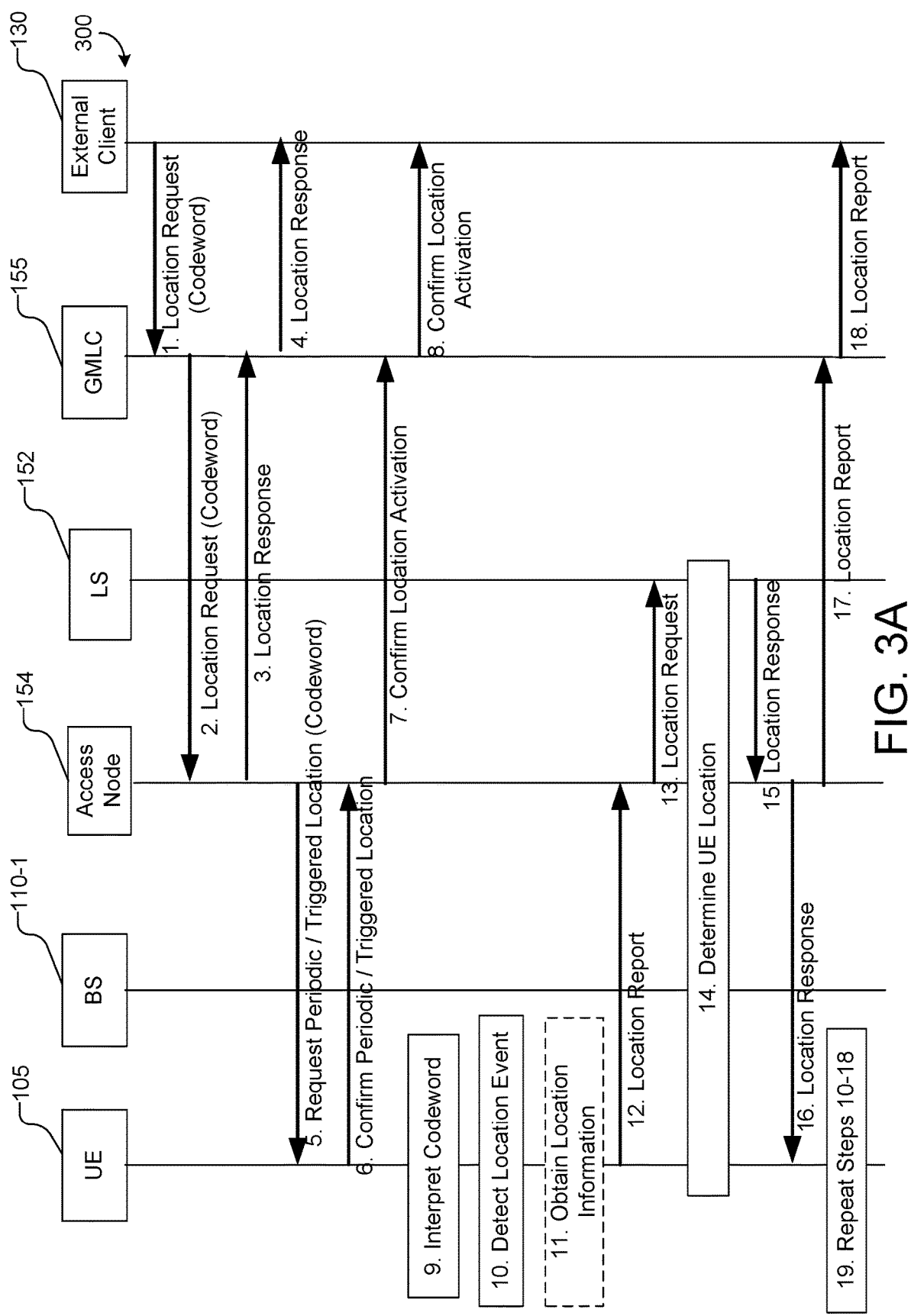

FIG. 3A shows a signaling flow 300 for a Mobile Terminated Location Request (MT-LR) procedure for a UE 105 that is similar to that shown in FIG. 2, but may be applicable when RAN 112 and core network 150 correspond to a 4G (LTE) network (e.g. where RAN 112 comprises an E-UTRAN and core network 150 comprises an EPC). In such a case: BS 110-1 may be an eNB; AN 154 may be an MME; and LS 152 may be an E-SMLC.

At stage 1 in FIG. 3A, external client 130 sends a location request for periodic or triggered location of UE 105 to GMLC 155. As described for stage 1 of FIG. 2, the location request may be sent directly to GMLC 155 by external client or may be sent via an HGMLC for UE 105 (not shown in FIG. 3A). As also described for stage 1 of FIG. 2, the location request may include an identity for the external client 130 which may be verified (e.g., authenticated by GMLC 155) and a codeword that provides trigger criteria for the UE 105, where the trigger criteria may not be visible to other entities in the wireless network including the GMLC 155, Location Server 152, and Access Node 154. The codeword may be meaningful to UE 105 (e.g. the codeword may be configured in advance in UE 105) and may indicate a particular type, or particular types, of triggered and/or periodic event to be detected and reported by UE 105. For example, the codeword may provide the type of location (or location event or trigger event) reporting being requested. Stage 1 for FIG. 3A may correspond exactly or nearly exactly to stage 1 for FIG. 2 (e.g. as described previously) including the various options and alternatives for the content of the location request and the codeword sent by external client 130 at stage 1.

At stage 2, the GMLC 155 transmits the location request with the codeword, the identity of the external client 130, and other parameters sent by the external client 130 at stage 1, to the Access Node 154. Stage 2 for FIG. 3A may correspond exactly or almost exactly to stage 2 for FIG. 2. As for stage 2 of FIG. 2, GMLC 155 may query UDM/HSS 156 for the address of the serving AN 154 for UE 105 (not shown in FIG. 3A) prior to sending the location request to AN 154 at stage 2.

At stages 3 and 4, the Access Node 154 returns an acknowledgment to external client 130, via the GMLC 155, indicating that the request for periodic or triggered location for UE 105 was accepted.

At stage 5, the Access Node 154 may wait until UE 105 becomes reachable and/or may send a notification to UE 105 to verify user privacy requirements as described for FIG. 2 (and not shown in FIG. 3A). As a further part of stage 5, AN 154 sends a request to the target UE 105 (e.g. via base station 110-1) for periodic or triggered location of UE 105. Similar to stage 6 in FIG. 2, AN 154 includes all information in the request needed to enable UE 105 to perform subsequent stages 10-12, including the codeword, the identity of the external client 130 and a GMLC 155 ID or address and a GMLC reference identifier. The codeword sent at stage 5 may be identical to the codeword sent at stage 1 in terms of semantics, though may be encoded differently. For example, if the codeword sent at stage 1 comprises an integer, the codeword sent at stage 5 also comprises an integer with the same value as at stage 1, although the encoding may be different (e.g. decimal at stage 1 and binary at stage 5). The request sent at stage 5 may indicate types of location information the UE 105 needs to, or is allowed to, obtain at stage 11 (e.g. such as particular position measurements or a location estimate for UE 105), and other parameters for triggered and periodic location of UE 105 that were provided explicitly to GMLC 155 by external client 130 at stage 1 and not as part of the codeword. As described earlier, these other parameters may include a duration of reporting, a total number of reports, a minimum and/or a maximum time interval between successive event reports, a minimum and/or maximum event sampling interval to be used by UE 105 at stage 10, whether location estimates may be included in event reports (and an associated QoS), and/or whether only one location report is required or more than one. In some embodiments, the request sent at stage 5 may comprise a message for supplementary services.

At stage 6, UE 105 returns a response to Access Node 154 (e.g. via base station 110-1) confirming acceptance of the request. In some embodiments, the response sent at stage 6 may comprise a message for supplementary services.

At stages 7 and 8, Access Node 154 confirms activation of periodic and triggered location in the target UE 105 to the External Client 130 via GMLC 155.

At stage 9, the UE 105 processes (e.g., interprets) the codeword to determine the type(s) of periodic and triggered location event or events to be detected by UE 105 at stage 10 (e.g. such as entering into an area, leaving from an area, being inside an area, periodic reporting or motion event reporting, etc.). The processing (e.g. interpretation) of the codeword may be based on the identification (e.g. ID) for the external client 130. For example, UE 105 may be configured with values for one or more codewords which are applicable only to one particular external client or to one particular group of external clients. If an identity for external client 130 matches an identity for an external client configured in UE 105, UE 105 may process (e.g. interpret) the codeword based only on codewords configured in UE 105 for external client 130. This may avoid UE 105 mistaking a codeword sent by external client 130 with a codeword configured in UE 105 for a different external client, which may avoid incorrect event reporting by UE at stage 12.

At stage 10, UE 105 monitors for the requested periodic or triggered location event or events and determines when an event has occurred. For trigger events which are not strictly periodic and not based only on a time of day or day of week, UE 105 may monitor for the requested event (or trigger event) at intervals that are (i) equal to or less than a maximum event sampling interval received at stage 5, and/or (ii) equal to or greater than a minimum event sampling interval received at stage 5. If no maximum or minimum event sampling intervals were received at stage 5 (e.g. due to not being included by external client 130 at stage 1 or by GMLC 155 as part of stage 2), UE 105 may use a default minimum and/or maximum event sampling interval. The use of a minimum and/or maximum event sampling interval at stage 10 may enable a limitation or reduction in UE 105 power and/or battery consumption for event monitoring and/or a limitation on the maximum delay in detecting an event. An event (or trigger event) may be detected by UE 105 when any of the following occur: (i) a requested trigger event not strictly time related (e.g. such as an event corresponding to entering into an area, leaving from an area or being inside an area) has been detected by UE 105 and a minimum reporting interval (if included at stage 5) has elapsed since the last report at stage 12 (if this is not the first event report); (ii) a requested periodic or other strictly time related location event has occurred; or (iii) a maximum reporting interval has expired. An event trigger corresponding to alternative (iii) and its subsequent reporting as described further on in association with stages 12 to 18 may enable network entities (e.g. GMLC 155 or Access Node 154) and external client 130 to determine whether periodic and triggered location reporting is still active in UE 105. In some implementations, the type of periodic and triggered location event interpreted from the codeword at stage 9 may include a plurality of trigger events and the UE 105 detects one (or more) of the plurality of trigger events at stage 10. After an event is detected by UE 105 at stage 10, UE 105 proceeds to stage 11.

At stage 11, UE 105 may obtain location information (e.g. visible cell IDs, downlink (DL) location measurements and/or a location estimate for UE 105) if requested at stage 5 for the trigger event detected at stage 10. In some embodiments, the location information obtained at stage 11 may be based on (e.g. requested by) the codeword.

At stage 12, UE 105 selects a suitable serving cell and serving base station if UE 105 is currently in an Idle state and may request and obtain a signaling connection to this serving base station and to a serving AN in core network 150. In this example, the serving base station and serving AN for UE 105 are assumed to be base station 110-1 and AN 154, respectively, but could be another base station 110 different from base station 110-1 and/or another AN different from AN 154. UE 105 may then send a message (e.g. a supplementary services message such as an MO-LR message) to Access Node 154 (via base station 110-1) indicating an event report (also referred to as a location report) for the trigger event detected at stage 10. When a location estimate is required for the detected trigger event, UE 105 may include the location information from stage 11 and any QoS received at stage 5. The UE 105 may include in the message sent at stage 12 a second codeword that identifies the trigger event detected by the UE at stage 10.

At stage 13, if UE 105 indicates that a location estimate is required at stage 12 and if UE 105 did not include a location estimate in the location report sent at stage 12, or did not include a location estimate which has sufficient accuracy (e.g. according to a QoS included at stage 12), the Access Node 154 may instigate location of the UE 105 by determining (e.g. selecting) an LS 152 and sending a location request message for UE 105 to Location Server 152. The location request message may include any location information and/or QoS received from UE 105 at stage 12. When a location estimate is not required or when an accurate enough location estimate is included at stage 12, AN 154 may skip stages 13-15 and may proceed to stage 16.

At stage 14, the Location Server 152 may obtain a location for UE 105. For example, the Location Server 152 may obtain a location based only on any location information included in the location request message received at stage 13. Alternatively, the Location Server 152 may exchange positioning protocol messages (e.g. LPP or NPP messages) with UE 105 and/or may exchange positioning protocol messages (e.g. LPPa or NRPPa messages) with the serving base station 110-1 for UE 105. The positioning protocol messages may be exchanged via Access Node 154 and via base station 110-1 in the case of messages exchanged with UE 105. Location Server 152 may use the positioning protocol messages to request and receive location measurements from UE 105 (e.g. for A-GNSS, OTDOA, ECID and/or WLAN positioning) and/or may use the positioning protocol messages to request and receive location measurements (e.g. for ECID positioning) from the serving base station 110-1 for UE 105. Location Server 152 may also use the positioning protocol messages to provide assistance data to UE 105 to help enable UE 105 to obtain location measurements (e.g. for A-GNSS, OTDOA, ECID or WLAN positioning) and possibly to compute a location estimate from these location measurements. Location Server 152 may then determine (or verify) a location estimate for UE 105 from the received location measurements (e.g. according to the A-GNSS, OTDOA, ECID or WLAN position methods) and/or using any location information received at stage 13.

At stage 15, the Location Server 152 may return the location estimate to Access Node 154.

At stage 16, Access Node 154 sends a response message (e.g. a supplementary services response message such as an MO-LR response message) to UE 105 confirming that a location event report will be sent to external client 130.

At stage 17, the Access Node 154 forwards the UE 105 location estimate (if received from UE 105 at stage 12 or obtained from LS 152 at stage 15) and/or an event report to the GMLC 155. Where the UE 105 provides a second codeword at stage 12 identifying the trigger event (or trigger events) that was (or were) detected by the UE at stage 10, the Access Node 154 may provide the second codeword in the location report to GMLC 155, and the second codeword may be provided to the External Client 130 by the GMLC 155, e.g., at stage 18.

At stage 18, the GMLC 155 forwards the UE 105 location estimate and/or an event report (e.g., which may comprise the second codeword) to the external client 130.

At stage 19, UE 105 may initiate a repetition of stages 10-18 for further periodic or trigger events and may cease when a maximum duration or maximum number of event reports has been reached.

Figure 3B:
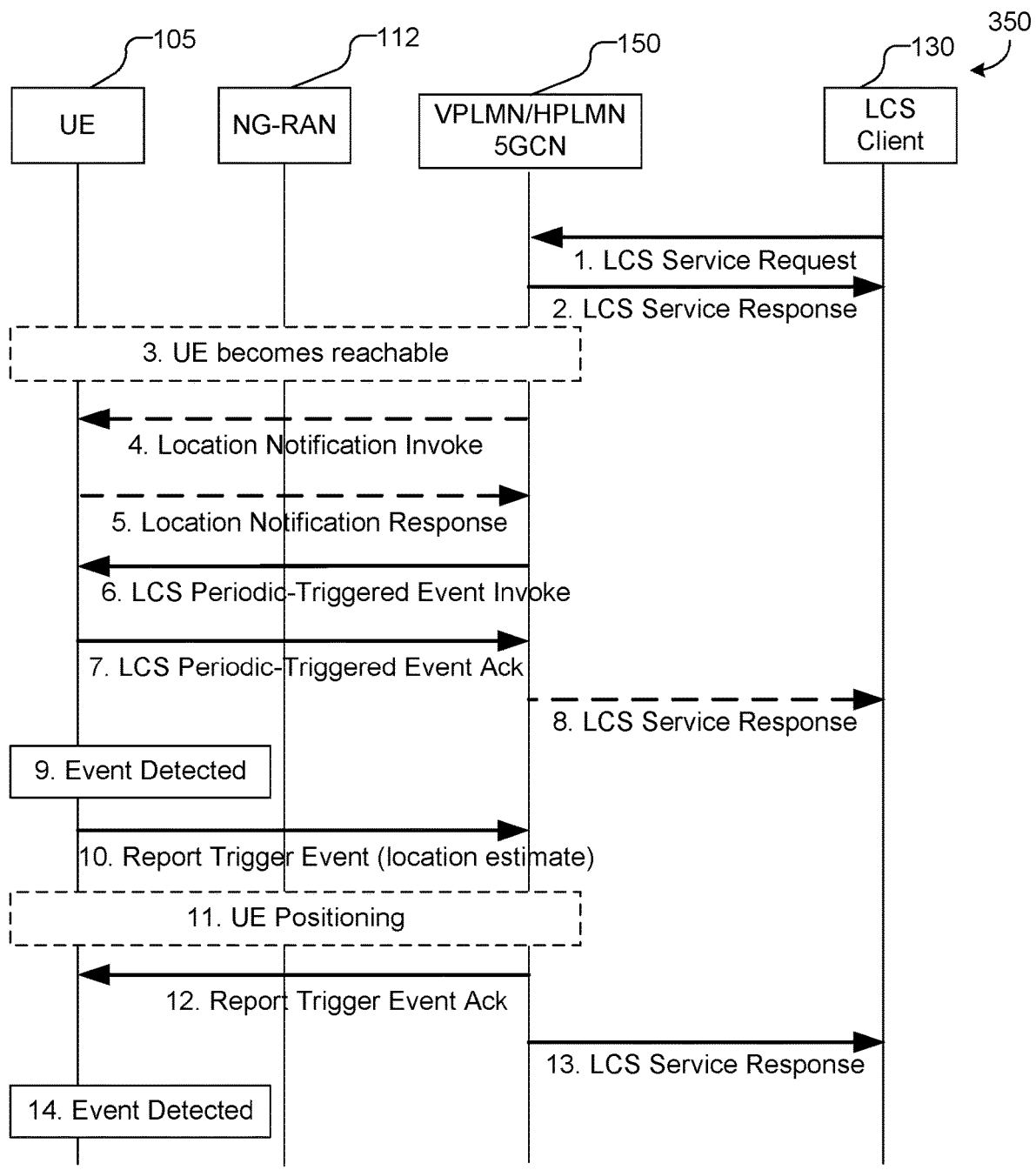

FIG. 3B shows a signaling flow 350 for support of a Periodic and Triggered 5GC-Mobile Terminated Location Request (5GC-MT-LR) Procedure using codewords, referred to below as transparent containers. The signaling flow 350 is for UE 105 in a 5G System (5GS) defined by 3GPP to support 5G NR wireless access, where: (i) the RAN 112 in FIG. 1 may be an NG-RAN 112 containing BSs 110 which comprise gNBs and/or ng-eNBs; (ii) the core network 150 in FIG. 1 may be a 5GCN comprising an AMF as the Access Node 154, an LMF as the Location Server 152 and a VGMLC and/or HGMLC that may be similar or identical to the GMLC 155; and (iii) the external client 130 in FIG. 1 may be a Location Services (LCS) client 130. The messages shown in FIG. 3B may depend on a particular type of Periodic and Triggered 5GC-MT-LR procedure which may be similar to or the same as the procedure described for FIG. 2 or may be different.

At stage 1 in FIG. 3B, an external LCS client 130 sends a location request for periodic and triggered location for a target UE 105 to a VPLMN or HPLMN core network 150 for the UE 105 (e.g. a GMLC 155 not shown in FIG. 3B). The location request provides the type of location reporting being requested and associated parameters. The location request includes a transparent container TC1 that includes details of the trigger events to be reported. The transparent container TC1 may be encoded according to a standard (e.g. 3GPP) definition and/or a proprietary definition particular to the LCS Client. The location request may also include common parameters applicable to all type of trigger events such as a maximum duration of event reporting, a maximum number of event reports, whether a location estimate is required for each event report, a maximum interval and/or a minimum interval between consecutive event reports, and a maximum and/or a minimum event sampling interval for the target UE.

At stage 2, the HPLMN and/or VPLMN core network(s) 150 determine whether to accept or reject the location request—e.g. based on the common parameters and subscription information for the LCS Client 130 and the target UE 105. For a roaming UE 105, where the request in stage 1 is sent to the HPLMN core network 150, the HPLMN core network 150 transfers the request to the VPLMN core network 150 (not shown in FIG. 3B, which, for simplicity, does not distinguish between an HPLMN and a VPLMN core network 150). If the request is accepted, the VPLMN or HPLMN core network 150 returns a confirmation to the LCS Client 130.

At stage 3, if the UE 105 is not currently reachable, the HPLMN/VPLMN core network 150 waits for the UE 105 to become reachable.

At stages 4-5, once the UE 105 is reachable, the HPLMN/VPLMN core network 150 may verify UE 105 privacy requirements, e.g. via a supplementary services interaction between HPLMN/VPLMN core network 150 and UE 105.

At stage 6, the HPLMN/VPLMN core network 150 sends a request to the UE 105 to perform periodic and triggered location. The request carries the location request information provided by the LCS Client 130 in stage 1, including the transparent container TC1 and any common parameters, and may include the identity of the LCS Client 130.

At stage 7, the UE 105 interprets the transparent container TC1 using either a standardized 3GPP definition or a proprietary definition particular to the LCS Client 130. A proprietary definition may be identified from the LCS Client 130 identity, if received in stage 6, or from some standardized ID included in the container TC1 if the container TC1 is at least partially standardized. The interpretation at stage 7 may include determining a type, or types, of periodic and triggered location event. If the request can be supported, the UE 105 returns an acknowledgment to the HPLMN/VPLMN core network 150.

At stage 8, depending on the particular Periodic and Triggered 5GC-MT-LR procedure, the VPLMN and/or the HPLMN core network 150 may return a response to the LCS Client 130 to confirm that event reporting for periodic and triggered location was activated in the UE 105.

At stage 9, the UE 105 monitors for occurrence of the trigger event(s) defined by the transparent container TC1. When a trigger event is detected, the UE 105 proceeds to stage 10.

At stage 10, the UE 105 sends a report to the HPLMN/VPLMN core network 150 for the detected trigger event(s) and may include a location estimate and/or downlink location measurements if available to the UE 105 and if requested in stage 6. The report sent at stage 10 may include a second transparent container TC2 indicating the type of detected trigger event, e.g. when more than one type of trigger event was requested by the LCS Client 130.

At stage 11, if a location estimate was not included in stage 10 and if reporting of location estimates was requested by the LCS Client 130, the HPLMN/VPLMN core network 150 (e.g. an LMF in HPLMN/VPLMN core network 150) performs positioning of the UE 105 (e.g. by requesting and obtaining location information for UE 105 from UE 105 using LPP and/or from NG-RAN 112 using NRPPa) and obtains a location estimate for UE 105.

At stage 12, the HPLMN/VPLMN core network 150 may send an acknowledgment to the UE 105 to confirm that an event report will be sent to the LCS client 130.

At stage 13, the HPLMN/VPLMN core network 150 sends an event report to the LCS Client 130 and includes any transparent container TC2 received at stage 10 and any location estimate received at stage 10 or obtained at stage 11.

At stage 14, the UE 105 continues to monitor for further trigger events and instigates stages 10-13 each time a trigger event is detected.

Figure 4:
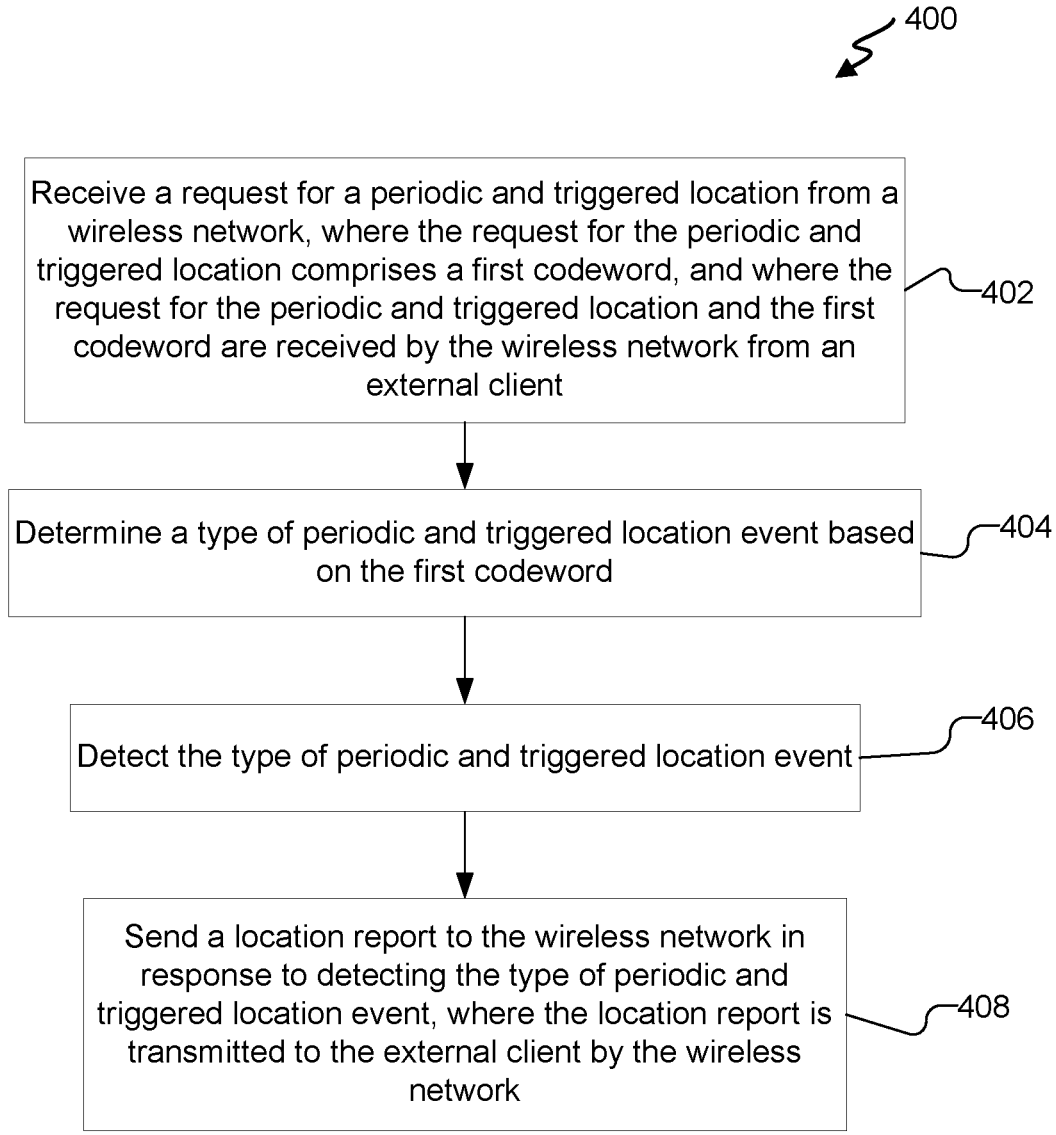
FIG. 4 is a process flow illustrating a method performed by a UE for supporting periodic and triggered location by the UE using a codeword.

FIG. 4 is a process flow 400 illustrating a method for supporting periodic and triggered location by a UE according to embodiments described herein. Process flow 400 may be performed by a UE such as the UE 105. As illustrated, at block 402, the UE receives a request for a periodic and triggered location from a wireless network (e.g. an EPS or 5GS such as RAN 112 and core network 150), where the request for the periodic and triggered location comprises a first codeword, and where the request for the periodic and triggered location and the first codeword are received by the wireless network from an external client (e.g. external client 130), e.g. as at stage 1 in each of FIGS. 2-3B. The first codeword may comprise at least one of a bit string, octet string, character string, integer or character. Additionally, the first codeword received by the wireless network from the external client and the first codeword received by the UE from the wireless network may each comprise an identical plurality of one or more identical values, although the encoding of the values received by the UE may differ from the encoding of the values received by the wireless network. In some embodiments, the first codeword is not interpreted by the wireless network. Block 402 may correspond to stage 6 in FIG. 2, to stage 5 in FIG. 3A and/or to stage 6 in FIG. 3B in some embodiments.

At block 404, the UE determines a type of periodic and triggered location event based on the first codeword (e.g. as at stage 11 in FIG. 2, stage 9 in FIG. 3A and stage 7 in FIG. 3B). For example, the type of periodic and triggered location event may be a periodic trigger event, an area based trigger event, a UE motion based trigger event, a time of day based trigger event, a day of week based trigger event, a location based trigger event, a velocity based trigger event, a user based trigger event, or some combination of these. The UE, for example, may be pre-configured with the first codeword and the type of periodic and triggered location event. The request for the periodic and triggered location may include an identity for the external client, and the type of periodic and triggered location event may be determined at block 404 based on the first codeword and the identity for the external client.

At block 406, the type of periodic and triggered location event is detected by the UE (e.g. as at stage 12 in FIG. 2, stage 10 in FIG. 3A and stage 9 in FIG. 3B).

At block 408, the UE sends a location report to the wireless network in response to detecting the type of periodic and triggered location event (e.g. as at stage 14 in FIG. 2, stage 12 in FIG. 3A and stage 10 in FIG. 3B). Here, the location report may be transmitted to the external client by the wireless network (e.g. as at stage 18 in FIG. 2, stage 18 in FIG. 3A and stage 13 in FIG. 3B).

In some implementations, the UE may detect the type of periodic and triggered location event at a plurality of different times (e.g. as at repetitions invoked by stage 19 in FIG. 2, stage 19 in FIG. 3A and stage 14 in FIG. 3B), and may send a location report to the wireless network at each of the plurality of different times in response to detecting the type of periodic and triggered location event at each of the plurality of different times. Here, the location report sent at each of the plurality of different times may be transmitted to the external client by the wireless network (e.g. as at repetitions of stage 18 in FIG. 2, stage 18 in FIG. 3A and stage 13 in FIG. 3B).

The UE may additionally obtain location information based at least in part on the first codeword in response to detecting the type of periodic and triggered location event (e.g. as at stage 13 in FIG. 2 and stage 11 in FIG. 3A). The location information, for example, may comprise downlink location measurements, a location estimate or both. The UE may include the location information in the location report sent at block 408, and the wireless network (e.g. an LMF or E-SMLC in the wireless network) may determine a location for the UE based at least in part on the location information (e.g. as at stage 16 in FIG. 2 and stage 14 in FIG. 3A). Further, the location report transmitted to the external client by the wireless network may include the location.

In some implementations, the type of periodic and triggered location event determined at block 404 may comprise a plurality of trigger events, where detecting the type of periodic and triggered location event by the UE at block 406 comprises detecting a trigger event from the plurality of trigger events. In these implementations, the UE may include a second codeword in the location report sent at block 408 (e.g. as described for stage 14 of FIG. 2, stage 12 of FIG. 3A and stage 10 of FIG. 3B), where the second codeword identifies the trigger event from the plurality of trigger events, and where the location report transmitted to the external client by the wireless network includes the second codeword.

Additionally, the UE may receive at least one of an overall duration of location reporting, a maximum number of location event reports, or a combination thereof with the request for the periodic or triggered location received at block 402. The UE may then cease to send location reports to the wireless network when the overall duration or the maximum number of location event reports has been attained.

Figure 5:
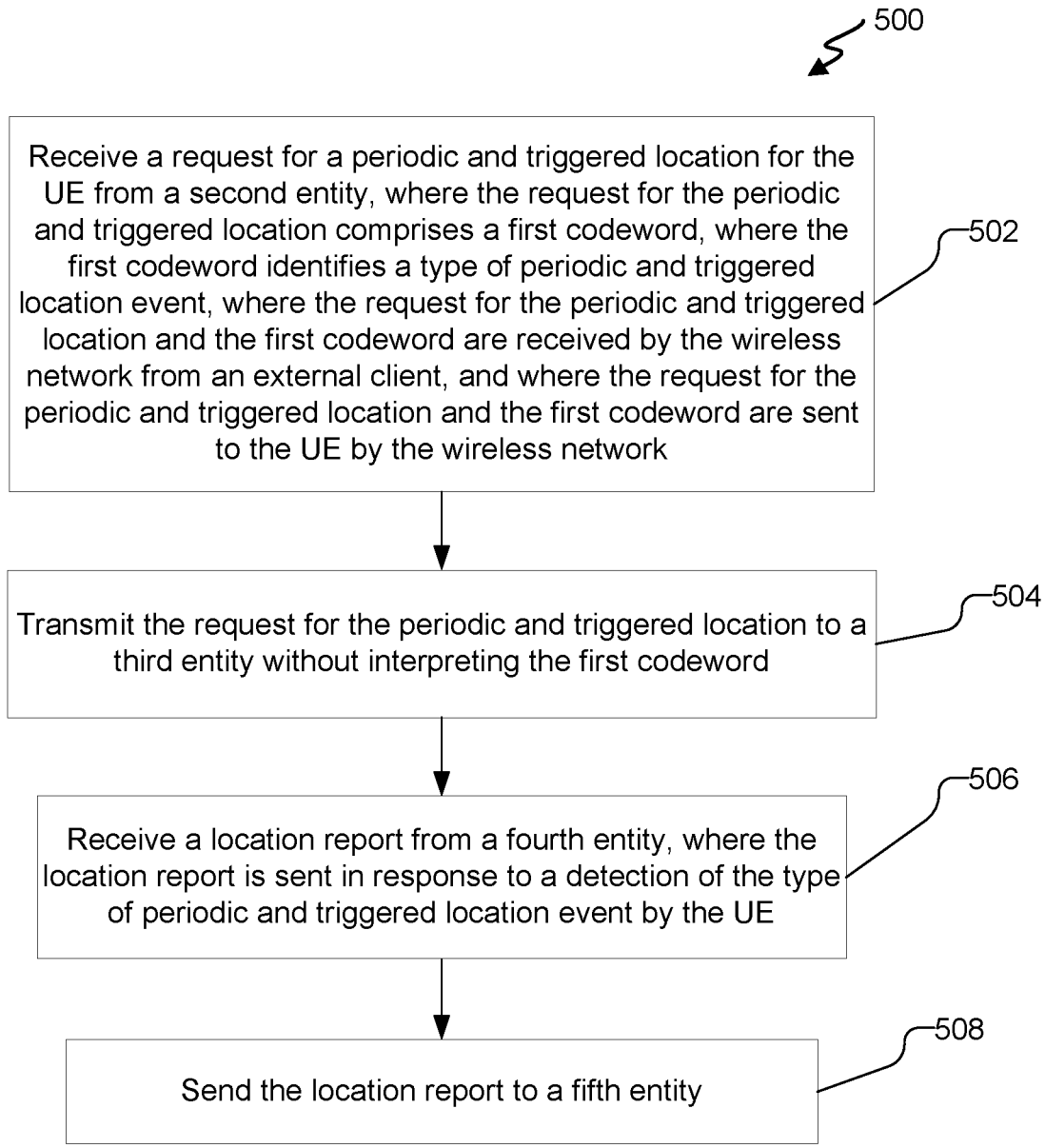
FIG. 5 is a process flow illustrating a method performed by an entity in a wireless network for supporting periodic and triggered location of a UE using a codeword.

FIG. 5 is a process flow 500 illustrating a method for supporting periodic and triggered location of a UE (e.g. UE 105) performed by a first entity in a wireless network. In different embodiments, the first entity may be an HGMLC (e.g. GMLC 155), a VGMLC (e.g. GMLC 155), an AN (e.g. AN 154), where the AN may be an MME, AMF, or an LS (e.g. LS 152), and where the LS may be an LMF. The wireless network may be an EPS or 5GS (e.g. may comprise RAN 112 and core network 150).

As illustrated, at block 502, the first entity receives a request for a periodic and triggered location for the UE from a second entity (e.g. as at stage 1, stage 2 or stage 5 in FIG. 2, or as at stage 1 or stage 2 in FIG. 3A). The request for the periodic or triggered location comprises a first codeword, which identifies a type of periodic and triggered location event. The request for the periodic and triggered location and the first codeword are received by the wireless network from an external client (e.g. as at stage 1 in FIG. 2 and stage 1 in FIG. 3A), where the request for the periodic and triggered location and the first codeword are sent to the UE by the wireless network (e.g. as at stage 6 in FIG. 2 and stage 5 in FIG. 3A).

At block 504, the request for the periodic and triggered location is transmitted to a third entity without interpreting the first codeword (e.g. as at stage 2, stage 5 or stage 6 of FIG. 2, or as at stage 2 or stage 5 of FIG. 3A).

At block 506, a location report is received from a fourth entity (e.g. as at stage 15 or stage 17 of FIG. 2 or as at stage 12 or stage 17 of FIG. 3A), where the location report is sent in response to a detection of the type of periodic and triggered location event by the UE.

At block 508, the location report is sent to a fifth entity (e.g. as at stage 15, stage 17 or stage 18 of FIG. 2 or as at stage 17 or stage 18 of FIG. 3A).

The first codeword may comprise at least one of a bit string, octet string, character string, integer or character. Additionally, the first entity may not modify a value or values of the first codeword. The first codeword may not be interpreted by any of the first entity, the second entity or the third entity.

The UE may be pre-configured with the first codeword and the type of periodic and triggered location event. The type of periodic and triggered location event may comprise a periodic trigger event, an area based trigger event, a UE motion based trigger event, a time of day based trigger event, a day of week based trigger event, a location based trigger event, a velocity based trigger event, a user based trigger event, or some combination of these.

In some implementations, the UE may detect the type of periodic and triggered location event at a plurality of different times (e.g. as at stage 19 in FIG. 2, stage 19 in FIG. 3A and stage 14 in FIG. 3B). The first entity may then receive a location report from the fourth entity following each of the plurality of different times that the UE detects the type of periodic and triggered location event, and may send the location report following each of the plurality of different times to the fifth entity.

In some implementations, the location report received from the fourth entity at block 506 comprises location information obtained by the UE in response to the detection of the type of periodic and triggered location event by the UE, where the obtaining by the UE is based at least in part on the first codeword, and where the location information comprises downlink location measurements, a location estimate or both. In these implementations, the first entity may determine a location for the UE based at least in part on the location information (e.g. as at stage 16 in FIG. 2 or stage 14 in FIG. 3A), and the location report sent to the fifth entity at block 508 may include the location.

In some implementations, the type of periodic and triggered location event comprises a plurality of trigger events, and the location report received from the fourth entity at block 506 may comprise a second codeword that identifies a trigger event from the plurality of trigger events that was detected by the UE. In these implementations, the location report sent to the fifth entity at block 508 may include the second codeword.

In some implementations, at least one of an overall duration of location reporting, a maximum number of location event reports, or a combination thereof may be received with the request for the periodic or triggered location received from the second entity at block 502. In these implementations, the at least one of the overall duration of location reporting, the maximum number of location event reports, or the combination thereof may be sent with the request for the periodic or triggered location to the third entity at block 504.

In some implementations, the request for the periodic and triggered location received at block 502 further comprises an identity for the external client. In these implementations, the first entity may include the identity for the external client with the request for the periodic or triggered location transmitted to the third entity at block 504.

In some implementations, the first entity may comprise a Visited Gateway Mobile Location Center (VGMLC) (e.g. GMLC 155), the second entity and the fifth entity may both comprise the external client (e.g. external client 130) or a Home Gateway Mobile Location Center (HGMLC) (e.g. GMLC 155), and the third entity and the fourth entity may each comprise one of a Mobility Management Entity (MME) (e.g. as an example of AN 154 for an EPS), an Access and Mobility Management Function (AMF) (e.g. as an example of AN 154 for a 5GS), or a Location Management Function (LMF) (e.g. as an example of LS 152 for a 5GS).

In some implementations, the first entity may comprise a Home Gateway Mobile Location Center (HGMLC) (e.g. GMLC 155), the second entity and the fifth entity may both comprise the external client (e.g. external client 130), and the third entity and the fourth entity may each comprise one of a Visited Gateway Mobile Location Center (VGMLC) (e.g. GMLC 155), a Mobility Management Entity (MME) (e.g. an example of AN 154 for an EPS), an Access and Mobility Management Function (AMF) (e.g. an example of AN 154 for a 5GS), or a Location Management Function (LMF) (e.g. an example of LS 152 for a 5GS).

In some implementations, the first entity may comprise a Mobility Management Entity (MME) (e.g. an example of AN 154 for an EPS), the second entity and the fifth entity may both comprise a Home Gateway Mobile Location Center (HGMLC) (e.g. GMLC 155) or a Visited Gateway Mobile Location Center (VGMLC) (e.g. GMLC 155), and the third entity and the fourth entity may both comprise the UE (e.g. UE 105).

In some implementations, the first entity may comprises an Access and Mobility Management Function (AMF) (e.g. an example of AN 154 for a 5GS), the second entity may comprise a Home Gateway Mobile Location Center (HGMLC) (e.g. GMLC 155) or a Visited Gateway Mobile Location Center (VGMLC) (e.g. GMLC 155), the third entity and the fifth entity may each comprise a Location Management Function (LMF) (e.g. an example of LS 152 for a 5GS), and the fourth entity may comprise the UE.

In some implementations, the first entity may comprise a Location Management Function (LMF) (e.g. an example of LS 152 for a 5GS), the second entity may comprise an Access and Mobility Management Function (AMF) (e.g. an example of AN 154 for a 5GS), the third entity and the fourth entity may both comprise the UE, and the fifth entity may comprise a Home Gateway Mobile Location Center (HG-MLC) (e.g. GMLC 155) or a Visited Gateway Mobile Location Center (VGMLC) (e.g. GMLC 155).

Figure 6:
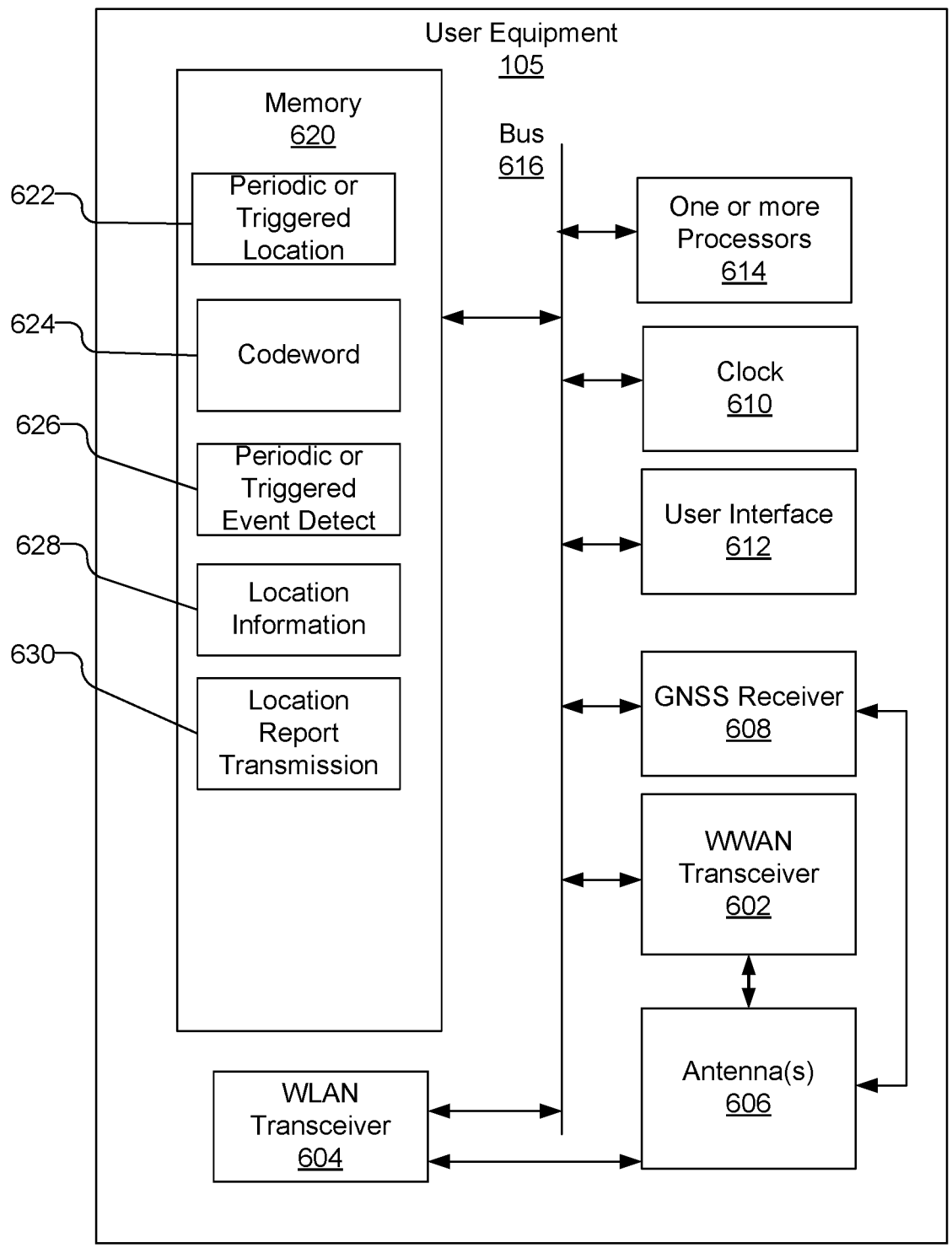
FIG. 6 is a diagram illustrating an example of a hardware implementation of a UE capable of periodic and triggered location using a codeword.

FIG. 6 is a diagram illustrating an example of a hardware implementation of UE 105, e.g. as described for FIGS. 1-5. The UE 105 may include a Wireless Wide Area Network (WWAN) transceiver 602 to wirelessly communicate with, e.g., cellular transceivers such as base station 110-1. The UE 105 may also include a WLAN transceiver 604 to wirelessly communicate with local transceivers (e.g. WiFi APs or BT APs). The UE 105 may include one or more antennas 606 that may be used with the WWAN transceiver 602 and WLAN transceiver 604. The UE 105 may further include a GNSS receiver 608 for receiving and measuring signals from GNSS SVs 190 (as shown in FIG. 1). The UE 105 may further include a clock (or stable frequency source) 610. The UE 105 may further include a user interface 612 that may include e.g., a display, a keypad, a microphone, a speaker, or other input device, such as virtual keypad on the display, through which a user may interface with the UE 105.

The UE 105 further includes one or more processors 614 and memory 620, which may be coupled together with a bus 616. The one or more processors 614 and other components of the UE 105 may similarly be coupled together with bus 616, a separate bus, or may be directly connected together or coupled using a combination of the foregoing. The memory 620 may be configured to store codewords and may contain executable code or software (or firmware) instructions that when executed by the one or more processors 614 cause the one or more processors 614 to operate as a special purpose computer programmed to perform the techniques disclosed herein. As illustrated in FIG. 6, the memory 620 may include one or more components or modules that may be implemented by the one or more processors 614 to perform the methodologies described herein. While the components or modules are illustrated as software in memory 620 that is executable by the one or more processors 614, it should be understood that the components or modules may be firmware or dedicated hardware either in the one or more processors 614 or off the processors.

The memory 620 may include a periodic or triggered location unit 622 that when implemented by the one or more processors 614 configures the one or more processors 614 to receive periodic or triggered location requests via the WWAN transceiver 602 or WLAN transceiver 604, as shown at stage 6 in signaling flow 200, stage 5 in signaling flow 300 and stage 6 in signaling flow 350. The request for a periodic or triggered location may include a codeword that identifies a periodic or triggering event and is assigned by an external client and that is not interpreted by a wireless network. The one or more processors 614 may be further configured to receive along with the request for the periodic or triggered location at least one of an ID for a server, authentication related information, an indication of a Quality of Service (QoS), or a combination thereof. The request for the periodic or triggered location may be ciphered. The memory 620 further includes a codeword unit 624 that when implemented by the one or more processors 614 configures the one or more processors 614 to determine the type of periodic and triggered location event based on the codeword, as described for stage 11 in signaling flow 200, stage 9 in signaling flow 300 and stage 7 in signaling flow 350. Where the request for the periodic and triggered location includes an identity for the external client, the type of periodic and triggered location event may be determined based on the codeword and the identity for the external client. The type of periodic and triggered location event, for example, may comprise a periodic trigger event, an area based trigger event, a UE motion based trigger event, a time of day based trigger event, a day of week based trigger event, a location based trigger event, a velocity based trigger event, or some combination of these. The codeword unit 624 may be pre-configured and may be reconfigurable so that new or different types of periodic and triggered location events may be enabled. The codeword, for example, may be at least one of a bit string, octet string, character string, integer or character that may be processed and interpreted by the one or more processors 614 based on data in the codeword unit 624. The memory 620 further includes a periodic or triggered event detect unit 626 that when implemented by the one or more processors 614 configures the one or more processors 614 to detect a periodic and triggered location event, e.g., using information obtained from the WLAN transceiver 604, WWAN transceiver 602, GNSS receiver 608, the clock 610, etc., as shown at stage 12 in signaling flow 200, stage 10 in signaling flow 300 and stage 9 in signaling flow 350. The memory 620 further includes a location information unit 628 that configures the one or more processors 614 to obtain location information, such as a serving cell ID, IDs for visible cells, downlink measurements for cells in a wireless network, downlink measurements for WLAN APs, downlink measurements for a GNSS, a location estimate for the UE 105, or a combination thereof, e.g., from the WLAN transceiver 604, WWAN transceiver 602, GNSS receiver 608, the clock 610, etc., as described for stage 13 in signaling flow 200, stage 11 in signaling flow 300 and stage 10 in signaling flow 350. A location report transmission unit 630 when implemented by the one or more processors 614 configures the one or more processors 614 to cause the WWAN transceiver 602 or WLAN transceiver 604 to transmit a location report to a serving base station or serving WLAN AP, where the location report may include the location information, an identification (ID) for the UE, an ID for the server and authentication information, as shown at stage 14 in signaling flow 200, stage 12 in signaling flow 300 and stage 10 in signaling flow 350. The location report may further include a second codeword, e.g., obtained from codeword unit 624, to identify the trigger event detected, e.g., if a plurality of trigger events are possible.

The methodologies described herein may be implemented by various means depending upon the application. For example, these methodologies may be implemented in hardware, firmware, software, or any combination thereof. For a hardware implementation, the one or more processors 614 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of UE 105 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 620) and executed by one or more processors 614, causing the one or more processors 614 to operate as a special purpose computer programmed to perform the techniques disclosed herein. Memory may be implemented within the one or processors 614 or external to the one or more processors 614. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by UE 105 may be stored as one or more instructions or code on a non-transitory computer-readable storage medium such as memory 620. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for UE 105 may be provided as signals on transmission media included in a communication apparatus. For example, a communication apparatus comprising part or all of UE 105 may include a transceiver having signals indicative of instructions and data. The instructions and data are stored on non-transitory computer readable media, e.g., memory 620, and are configured to cause the one or more processors 614 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, a user equipment, such as UE 105, may include a means for receiving a request for a periodic and triggered location from a wireless network, the request for the periodic and triggered location comprising a first codeword, the request for the periodic and triggered location and the first codeword received by the wireless network from an external client, which may be, e.g., the WWAN transceiver 602 and one or more processors 614 with dedicated hardware or implementing executable code or software instructions in memory 620 such as the periodic or triggered location unit 622. A means for determining a type of periodic and triggered location event based on the first codeword may be, e.g., one or more processors 614 with dedicated hardware or implementing executable code or software instructions in memory 620 such as the codeword unit 624. A means for detecting the type of periodic and triggered location event may be, e.g., the WWAN transceiver 602, the WLAN transceiver 604, the GNSS receiver 608, a clock 610, and one or more processors 614 with dedicated hardware or implementing executable code or software instructions in memory 620 such as the periodic or triggered event detect unit 626. A means for sending a location report to the wireless network in response to detecting the type of periodic and triggered location event, wherein the location report is transmitted to the external client by the wireless network may be, e.g., the WWAN transceiver 602 and one or more processors 614 with dedicated hardware or implementing executable code or software instructions in memory 620 such as the location report transmission unit 630.

The UE may further include a means for detecting the type of periodic and triggered location event at a plurality of different times, which may be, e.g., the WWAN transceiver 602, the WLAN transceiver 604, the GNSS receiver 608, a clock 610, and one or more processors 614 with dedicated hardware or implementing executable code or software instructions in memory 620 such as the periodic or triggered event detect unit 626. A means for sending a location report to the wireless network at each of the plurality of different times in response to detecting the type of periodic and triggered location event at each of the plurality of different times, wherein the location report at each of the plurality of different times is transmitted to the external client by the wireless network may be, e.g., the WWAN transceiver 602 and one or more processors 614 with dedicated hardware or implementing executable code or software instructions in memory 620 such as the location report transmission unit 630.

The UE may further include a means for obtaining location information based at least in part on the first codeword in response to detecting the type of periodic and triggered location event, wherein the location information comprises downlink location measurements, a location estimate or both, which may be, e.g., the WWAN transceiver 602, the WLAN transceiver 604, the GNSS receiver 608, and one or more processors 614 with dedicated hardware or implementing executable code or software instructions in memory 620 such as the location information unit 628. A means for including the location information in the location report, wherein the wireless network determines a location for the UE based at least in part on the location information, wherein the location report transmitted to the external client by the wireless network includes the location may be, e.g., the WWAN transceiver 602 and one or more processors 614 with dedicated hardware or implementing executable code or software instructions in memory 620 such as the location report transmission unit 630.

The type of periodic and triggered location event may comprise a plurality of trigger events, and the UE may include a means for including a second codeword in the location report, wherein the second codeword identifies the trigger event from the plurality of trigger events, wherein the location report transmitted to the external client by the wireless network include the second codeword, which may be, e.g., the WWAN transceiver 602 and one or more processors 614 with dedicated hardware or implementing executable code or software instructions in memory 620 such as the location report transmission unit 630.

The UE may further include a means for receiving at least one of an overall duration of location reporting, a maximum number of location event reports, or a combination thereof with the request for the periodic or triggered location, which may be, e.g., the WWAN transceiver 602 and one or more processors 614 with dedicated hardware or implementing executable code or software instructions in memory 620 such as the periodic or triggered location unit 622. A means for ceasing to send location reports to the wireless network when the overall duration or the maximum number of location event reports has been attained may be, e.g., the WWAN transceiver 602, the clock 610 and one or more processors 614 with dedicated hardware or implementing executable code or software instructions in memory 620 such as the location report transmission unit 630.

The request for the periodic and triggered location may include an identity for the external client, and the UE may further comprise means for determining the type of periodic and triggered location event based on the first codeword and the identity for the external client, which may be, e.g., one or more processors 614 with dedicated hardware or implementing executable code or software instructions in memory 620 such as the codeword unit 624.

Figure 7:
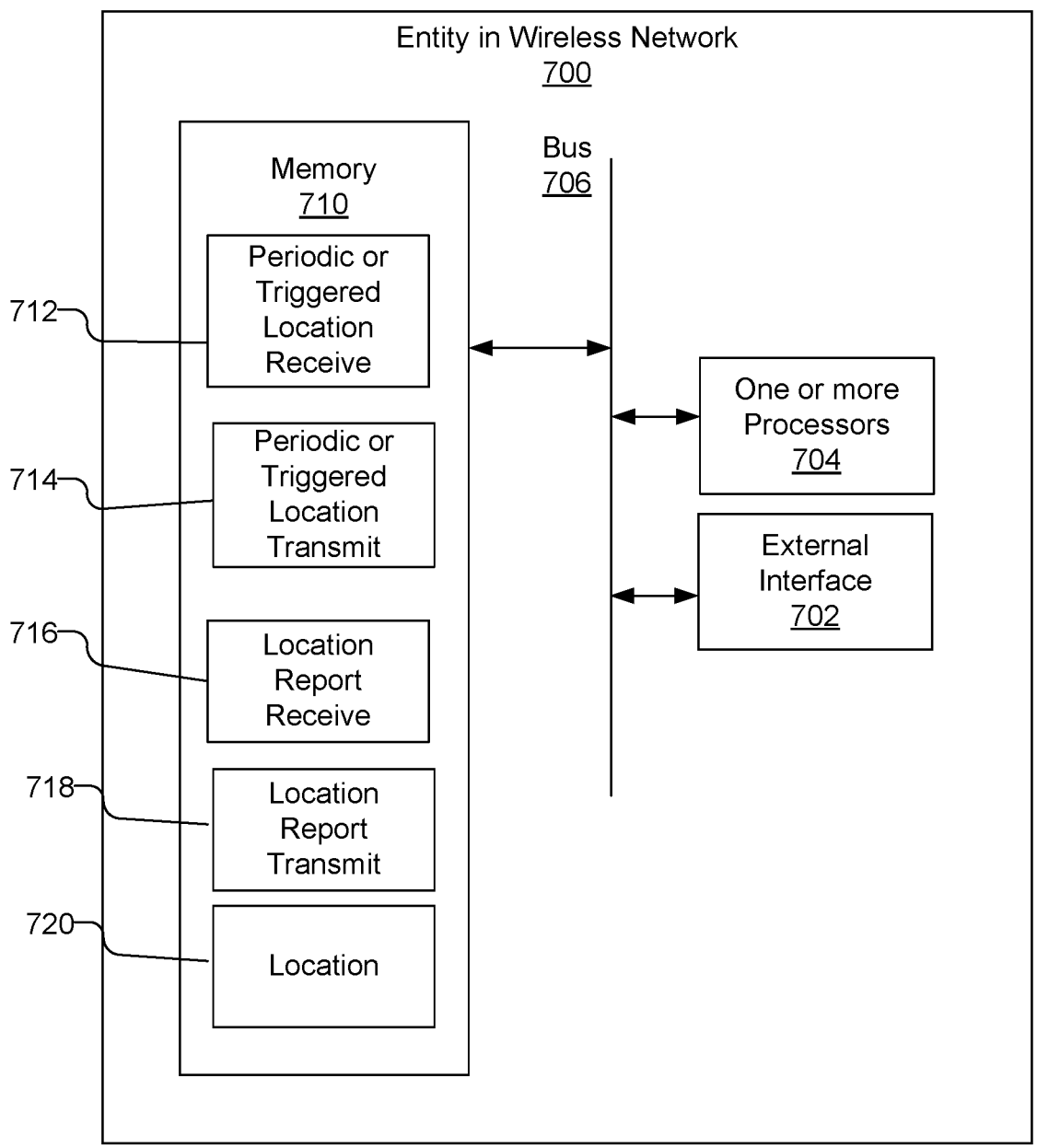
FIG. 7 is a diagram illustrating an example of a hardware implementation of an entity in a wireless network that supports periodic and triggered location of a UE using a codeword.

FIG. 7 is a diagram illustrating an example of a hardware implementation of an entity 700 in a wireless network (e.g. core network 150) that may support periodic and triggered location of a UE (e.g. UE 105) using a codeword. The entity 700 may be GMLC, such as GMLC 155 shown in FIG. 1, which may be, e.g., a Home GMLC (HGMLC) or a Visited GMLC (VGMLC). The entity 700 may be Location Server 152 or Access Node 154, as illustrated in FIG. 1, and may be, e.g., a Mobility Management Entity (MME), an Access and Mobility Management Function (AMF), or a Location Management Function (LMF). The entity 700 includes, e.g., hardware components such as an external interface 702, which may be a wired or wireless interface capable of connecting to UE 105, an external client 130 and/or other entities in a core network 150 and/or RAN 112 (e.g. a base station 110) directly or through one or more intermediary networks and/or one or more network entities. The entity 700 includes one or more processors 704 and memory 710, which may be coupled together with a bus 706. The memory 710 may contain executable code or software instructions that when executed by the one or more processors 704 cause the one or more processors to operate as a special purpose computer programmed to perform the techniques disclosed herein. As illustrated in FIG. 7, the memory 710 may include one or more components or modules that may be implanted by the one or more processors 704 to perform the methodologies as described herein. While the components or modules are illustrated as software in memory 710 that is executable by the one or more processors 704, it should be understood that the components or modules may be firmware or dedicated hardware either in the one or more processors 704 or off the processors.

For example, the memory 710 may include a periodic or triggered location receive unit 712 that when implemented by the one or more processors 704 enables the one or more processors 704 to receive via the external interface 702 a request for a periodic or triggered location for a user equipment (e.g. UE 105) from a second entity, which may be, e.g., a GMLC (e.g. a VGMLC or HGMLC) such as GMLC 155 shown in FIG. 1, the external client 130, or an access node such as AN 154 in FIG. 1 (e.g. which may be an AMF), as shown at stages 1, 2 and 5 in signaling flow 200, stages 1 and 2 in signaling flow 300, and stage 1 in signaling flow 350. The request for the periodic or triggered location may include a codeword, that identifies a type of periodic and triggered location event. The request for the periodic and triggered location and the codeword may be received by the wireless network from an external client and the request for the periodic and triggered location and the codeword may be sent to the UE by the wireless network. The memory 710 may further include a periodic or triggered location transmit unit 714 that when implemented by the one or more processors 704 enables the one or more processors 704 to transmit, e.g., via the external interface 702, the request for the periodic or triggered location to a third entity, as shown at stages 2, 5 and 6 in signaling flow 200, stages 2 and 5 in signaling flow 300 and stage 6 in signaling flow 350. The third entity, may be, e.g., a Visited Gateway Mobile Location Center (VGMLC), a Mobility Management Entity (MME), an Access and Mobility Management Function (AMF), a Location Management Function (LMF), or the UE. The request for the periodic or triggered location may be transmitted to the third entity without the first entity 700 interpreting the codeword. A location report receive unit 716 when implemented by the one or more processors 704 enables the one or more processors 704 to receive a location report from a fourth entity, e.g., via the external interface 702, where the location report is sent in response to a detection of a type of periodic and triggered location event by the UE, as shown at stages 15 and 17 in signaling flow 200, stages 12 and 17 in signaling flow 300 and stage 10 in signaling flow 350. The fourth entity, may be, e.g., a Visited Gateway Mobile Location Center (VGMLC), a Mobility Management Entity (MME), an Access and Mobility Management Function (AMF), a Location Management Function (LMF), or the UE.

A location report transmit unit 718 when implemented by the one or more processors 704 enables the one or more processors 704 to cause the external interface 702 to transmit the location report to a fifth entity, e.g. as shown at stages 15, 17 and 18 in signaling flow 200, stages 17 and 18 in signaling flow 300 and stage 13 in signaling flow 350. The fifth entity may be a GMLC (e.g. a VGMLC or HGMLC) such as GMLC 155 shown in FIG. 1, the external client 130, or a location server such as LS 152 in FIG. 1 (e.g. which may be an LMF). The location unit 720 when implemented by the one or more processors 704 configures the one or more processors 704 to compute or verify a location of the UE using location information received in the location report, where the location of the UE may be included in the location report transmitted to the fifth entity, as shown at stage 16 in signaling flow 200, stage 14 in signaling flow 300 and stage 11 in signaling flow 350.

The methodologies described herein may be implemented by various means depending upon the application. For example, these methodologies may be implemented in hardware, firmware, software, or any combination thereof. For a hardware implementation, the one or more processors 704 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For an implementation of entity 700 involving firmware and/or software, the methodologies may be implemented with modules (e.g., procedures, functions, and so on) that perform the separate functions described herein. Any machine-readable medium tangibly embodying instructions may be used in implementing the methodologies described herein. For example, software codes may be stored in a memory (e.g. memory 710) and executed by one or more processors 704, causing the one or more processors 704 to operate as a special purpose computer programmed to perform the techniques disclosed herein. Memory may be implemented within the one or processors 704 or external to the one or more processors 704. As used herein the term "memory" refers to any type of long term, short term, volatile, nonvolatile, or other memory and is not to be limited to any particular type of memory or number of memories, or type of media upon which memory is stored.

If implemented in firmware and/or software, the functions performed by entity 700 may be stored as one or more instructions or code on a non-transitory computer-readable storage medium such as memory 710. Examples of storage media include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage, semiconductor storage, or other storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer-readable storage medium, instructions and/or data for entity 700 may be provided as signals on transmission media included in a communication apparatus. For example, a communication apparatus comprising part or all of entity 700 may include a transceiver having signals indicative of instructions and data. The instructions and data are stored on non-transitory computer readable media, e.g., memory 710, and are configured to cause the one or more processors 704 to operate as a special purpose computer programmed to perform the techniques disclosed herein. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

Thus, an entity 700 in a wireless network may include a means for receiving a request for a periodic and triggered location for the UE from a second entity, the request for the periodic or triggered location comprising a codeword, wherein the codeword identifies a type of periodic and triggered location event, wherein the request for the periodic and triggered location and the codeword are received by the wireless network from an external client, wherein the request for the periodic and triggered location and the codeword are sent to the UE by the wireless network, which may be, e.g., the external interface 702 and one or more processors 704 with dedicated hardware or implementing executable code or software instructions in memory 710 such as the periodic or triggered location receive unit 712. A means for transmitting the request for the periodic and triggered location to a third entity without interpreting the codeword may be, e.g., the external interface 702 and one or more processors 704 with dedicated hardware or implementing executable code or software instructions in memory 710 such as the periodic or triggered location transmit unit 714. A means for receiving a location report from a fourth entity, wherein the location report is sent in response to a detection of the type of periodic and triggered location event by the UE may be, e.g., the external interface 702 and one or more processors 704 with dedicated hardware or implementing executable code or software instructions in memory 710 such as the location report receive unit 716. A means for sending the location report to a fifth entity may be, e.g., the external interface 702 and one or more processors 704 with dedicated hardware or implementing executable code or software instructions in memory 710 such as the location report transmit unit 718.

In some implementations, the entity may include a means for receiving a location report at each of the plurality of different times that the UE detects the type of periodic and triggered location event, which may be, e.g., the external interface 702 and one or more processors 704 with dedicated hardware or implementing executable code or software instructions in memory 710 such as the location report receive unit 716. A means for sending the location report at each of the plurality of different times to the fifth entity may be, e.g., the external interface 702 and one or more processors 704 with dedicated hardware or implementing executable code or software instructions in memory 710 such as the location report transmit unit 718.

The location report from the fourth entity may include location information obtained by the UE based at least in part on the codeword in response to detection of the type of periodic and triggered location event, wherein the location information comprises downlink location measurements, a location estimate or both, and the entity may further include a means for determining a location for the UE based at least in part on the location information, wherein the location report sent to the fifth entity includes the location, which may be, e.g., the one or more processors 704 with dedicated hardware or implementing executable code or software instructions in memory 710 such as the location unit 720.

The entity may include a means for receiving at least one of an overall duration of location reporting, a maximum number of location event reports, or a combination thereof with the request for the periodic or triggered location from the second entity, which may be, e.g., the external interface 702 and one or more processors 704 with dedicated hardware or implementing executable code or software instructions in memory 710 such as the periodic or triggered location receive unit 712. A means for sending the at least one of the overall duration of location reporting, the maximum number of location event reports, or the combination thereof with the request for the periodic or triggered location to the third entity may be, e.g., the external interface 702 and one or more processors 704 with dedicated hardware or implementing executable code or software instructions in memory 710 such as the periodic or triggered location transmit unit 712.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

One implementation may be a method for supporting periodic and triggered location of a user equipment (UE) by a first entity in a wireless network, the method comprising: receiving a request for a periodic and triggered location for the UE from a second entity, the request for the periodic and triggered location comprising a first codeword, wherein the first codeword identifies a type of periodic and triggered location event, wherein the request for the periodic and triggered location and the first codeword are received by the wireless network from an external client, wherein the request for the periodic and triggered location and the first codeword are sent to the UE by the wireless network; transmitting the request for the periodic and triggered location to a third entity without interpreting the first codeword; receiving a location report from a fourth entity, wherein the location report is sent in response to a detection of the type of periodic and triggered location event by the UE; and sending the location report to a fifth entity.

There may be some implementations of the above method, wherein the first codeword is not interpreted by the second entity or the third entity.

There may be some implementations of the above method, wherein a value for the first codeword is not modified by the first entity.

There may be some implementations of the above method, wherein the UE is pre-configured with the first codeword and the type of periodic and triggered location event.

There may be some implementations of the above method, wherein the first codeword comprises at least one of a bit string, octet string, character string, integer or character.

There may be some implementations of the above method, wherein the type of periodic and triggered location event comprises a periodic trigger event, an area based trigger event, a UE motion based trigger event, a time of day based trigger event, a day of week based trigger event, a location based trigger event, a velocity based trigger event, a user based trigger event, or some combination of these.

There may be some implementations of the above method, wherein the UE detects the type of periodic and triggered location event at a plurality of different times, the method further comprising: receiving a location report from the fourth entity following each of the plurality of different times that the UE detects the type of periodic and triggered location event; and sending the location report following each of the plurality of different times to the fifth entity.

There may be some implementations of the above method, wherein the location report from the fourth entity comprises location information obtained by the UE in response to the detection of the type of periodic and triggered location event, wherein the location information is obtained by the UE based at least in part on the first codeword, wherein the location information comprises downlink location measurements, a location estimate or both, the method further comprising: determining a location for the UE based at least in part on the location information, wherein the location report sent to the fifth entity includes the location.

There may be some implementations of the above method, wherein the type of periodic and triggered location event comprises a plurality of trigger events, wherein the location report received from the fourth entity comprises a second codeword that identifies a trigger event from the plurality of trigger events that was detected by the UE, wherein the location report sent to the fifth entity includes the second codeword.

There may be some implementations of the above method, further comprising receiving at least one of an overall duration of location reporting, a maximum number of location event reports, or a combination thereof with the request for the periodic or triggered location from the second entity and sending the at least one of the overall duration of location reporting, the maximum number of location event reports, or the combination thereof with the request for the periodic or triggered location to the third entity.

There may be some implementations of the above method, wherein the request for the periodic and triggered location further comprises an identity for the external client, and further comprising including the identity for the external client with the request for the periodic or triggered location transmitted to the third entity.

There may be some implementations of the above method, wherein the first entity comprises a Visited Gateway Mobile Location Center (VGMLC), the second entity and the fifth entity both comprise the external client or a Home Gateway Mobile Location Center (HGMLC), and the third entity and the fourth entity each comprises one of a Mobility Management Entity (MME), an Access and Mobility Management Function (AMF), or a Location Management Function (LMF).

There may be some implementations of the above method, wherein the first entity comprises a Home Gateway Mobile Location Center (HGMLC), the second entity and the fifth entity both comprise the external client, and the third entity and the fourth entity each comprises one of a Visited Gateway Mobile Location Center (VGMLC), a Mobility Management Entity (MME), an Access and Mobility Management Function (AMF), or a Location Management Function (LMF).

There may be some implementations of the above method, wherein the first entity comprises a Mobility Management Entity (MME), the second entity and the fifth entity both comprise a Home Gateway Mobile Location Center (HGMLC) or a Visited Gateway Mobile Location Center (VGMLC), and the third entity and the fourth entity both comprise the UE.

There may be some implementations of the above method, wherein the first entity comprises an Access and Mobility Management Function (AMF), the second entity comprises a Home Gateway Mobile Location Center (HGMLC) or a Visited Gateway Mobile Location Center (VGMLC), the third entity and the fifth entity each comprises a Location Management Function (LMF), and the fourth entity comprises the UE.

There may be some implementations of the above method, wherein the first entity comprises a Location Management Function (LMF), the second entity comprises an Access and Mobility Management Function (AMF), the third entity and the fourth entity both comprise the UE, and the fifth entity comprises a Home Gateway Mobile Location Center (HGMLC) or a Visited Gateway Mobile Location Center (VGMLC).

One implementation may be a first entity in a wireless network capable of supporting periodic and triggered location of a user equipment (UE) comprising an external interface transceiver configured to wirelessly communicate with the wireless network, memory containing executable code, and at least one processor coupled to the external interface and the memory and configured by the executable code to receive via the external interface a request for a periodic and triggered location for the UE from a second entity, the request for the periodic and triggered location comprising a first codeword, wherein the first codeword identifies a type of periodic and triggered location event, wherein the request for the periodic and triggered location and the first codeword are received by the wireless network from an external client, wherein the request for the periodic and triggered location and the first codeword are sent to the UE by the wireless network; transmit via the external interface the request for the periodic and triggered location to a third entity without interpreting the first codeword; receive via the external interface a location report from a fourth entity, wherein the location report is sent in response to a detection of the type of periodic and triggered location event by the UE; and send via the external interface the location report to a fifth entity.

There may be some implementations of the above first entity, wherein the first codeword is not interpreted by the second entity or the third entity.

There may be some implementations of the above first entity, wherein a value for the first codeword is not modified by the first entity.

There may be some implementations of the above first entity, wherein the UE is pre-configured with the first codeword and the type of periodic and triggered location event.

There may be some implementations of the above first entity, wherein the first codeword comprises at least one of a bit string, octet string, character string, integer or character.

There may be some implementations of the above first entity, wherein the type of periodic and triggered location event comprises a periodic trigger event, an area based trigger event, a UE motion based trigger event, a time of day based trigger event, a day of week based trigger event, a location based trigger event, a velocity based trigger event, a user based trigger event, or some combination of these.

There may be some implementations of the above first entity, wherein the UE detects the type of periodic and triggered location event at a plurality of different times, the at least one processor being further configured to receive via the external interface a location report from the fourth entity following each of the plurality of different times that the UE detects the type of periodic and triggered location event, and send via the external interface the location report following each of the plurality of different times to the fifth entity.

There may be some implementations of the above first entity, wherein the location report from the fourth entity comprises location information obtained by the UE in response to the detection of the type of periodic and triggered location event, wherein the location information is obtained by the UE based at least in part on the first codeword, wherein the location information comprises downlink location measurements, a location estimate or both, the at least one processor being further configured to determine a location for the UE based at least in part on the location information, wherein the location report sent to the fifth entity includes the location.

There may be some implementations of the above first entity, wherein the type of periodic and triggered location event comprises a plurality of trigger events, wherein the location report received from the fourth entity comprises a second codeword that identifies a trigger event from the plurality of trigger events that was detected by the UE, wherein the location report sent to the fifth entity includes the second codeword.

There may be some implementations of the above first entity, wherein the at least one processor is further configured to receive at least one of an overall duration of location reporting, a maximum number of location event reports, or a combination thereof with the request for the periodic or triggered location from the second entity and send via the external interface the at least one of the overall duration of location reporting, the maximum number of location event reports, or the combination thereof with the request for the periodic or triggered location to the third entity.

There may be some implementations of the above first entity, wherein the request for the periodic and triggered location further comprises an identity for the external client, and further comprising including the identity for the external client with the request for the periodic or triggered location transmitted to the third entity.

There may be some implementations of the above first entity, wherein the first entity comprises a Visited Gateway Mobile Location Center (VGMLC), the second entity and the fifth entity both comprise the external client or a Home Gateway Mobile Location Center (HGMLC), and the third entity and the fourth entity each comprises one of a Mobility Management Entity (MME), an Access and Mobility Management Function (AMF), or a Location Management Function (LMF).

There may be some implementations of the above first entity, wherein the first entity comprises a Home Gateway Mobile Location Center (HGMLC), the second entity and the fifth entity both comprise the external client, and the third entity and the fourth entity each comprises one of a Visited Gateway Mobile Location Center (VGMLC), a Mobility Management Entity (MME), an Access and Mobility Management Function (AMF), or a Location Management Function (LMF).

There may be some implementations of the above first entity, wherein the first entity comprises a Mobility Management Entity (MME), the second entity and the fifth entity both comprise a Home Gateway Mobile Location Center (HGMLC) or a Visited Gateway Mobile Location Center (VGMLC), and the third entity and the fourth entity each comprises the UE.

There may be some implementations of the above first entity, wherein the first entity comprises an Access and Mobility Management Function (AMF), the second entity comprises a Home Gateway Mobile Location Center (HGMLC) or a Visited Gateway Mobile Location Center (VGMLC), the third entity and the fifth entity each comprises a Location Management Function (LMF), and the fourth entity comprises the UE.

There may be some implementations of the above first entity, wherein the first entity comprises a Location Management Function (LMF), the second entity comprises an Access and Mobility Management Function (AMF), the third entity and the fourth entity both comprise the UE, and the fifth entity comprises a Home Gateway Mobile Location Center (HGMLC) or a Visited Gateway Mobile Location Center (VGMLC).

One implementation may be a first entity in a wireless network capable of supporting periodic and triggered location of a user equipment (UE) comprising: means for receiving a request for a periodic and triggered location for the UE from a second entity, the request for the periodic and triggered location comprising a first codeword, wherein the first codeword identifies a type of periodic and triggered location event, wherein the request for the periodic and triggered location and the first codeword are received by the wireless network from an external client, wherein the request for the periodic and triggered location and the first codeword are sent to the UE by the wireless network; means for transmitting the request for the periodic and triggered location to a third entity without interpreting the first codeword; means for receiving a location report from a fourth entity, wherein the location report is sent in response to a detection of the type of periodic and triggered location event by the UE; and means for sending the location report to a fifth entity.

One implementation may be a non-transitory storage medium including program code stored thereon, the program code is operable to cause at least one processor in a first entity in a wireless network support periodic and triggered location of a user equipment (UE) comprising: program code to receive a request for a periodic and triggered location for the UE from a second entity, the request for the periodic and triggered location comprising a first codeword, wherein the first codeword identifies a type of periodic and triggered location event, wherein the request for the periodic and triggered location and the first codeword are received by the wireless network from an external client, wherein the request for the periodic and triggered location and the first codeword are sent to the UE by the wireless network; program code to transmit the request for the periodic and triggered location to a third entity without interpreting the first codeword; program code to receive a location report from a fourth entity, wherein the location report is sent in response to a detection of the type of periodic and triggered location event by the UE; and program code to send the location report to a fifth entity.

Therefore, it is intended that claimed subject matter not be limited to the particular examples disclosed, but that such claimed subject matter may also include all aspects falling within the scope of appended claims, and equivalents thereof.

What is claimed is:

1. A method for supporting periodic and triggered location by a user equipment (UE) comprising:
   receiving a request for a periodic and triggered location from a wireless network, the request for the periodic and triggered location comprising a first codeword, the request for the periodic and triggered location and the first codeword received by the wireless network from an external client;
   determining a type of periodic and triggered location event based on the first codeword;
   detecting the type of periodic and triggered location event; and
   sending a location report to the wireless network in response to detecting the type of periodic and triggered location event, wherein the location report is transmitted to the external client by the wireless network.

2. The method of claim 1, wherein the first codeword is not interpreted by the wireless network.

3. The method of claim 1, wherein the UE is pre-configured with the first codeword and the type of periodic and triggered location event.

4. The method of claim 1, wherein the first codeword comprises at least one of a bit string, octet string, character string, integer or character.

5. The method of claim 1, wherein the type of periodic and triggered location event comprises a periodic trigger event, an area based trigger event, a UE motion based trigger event, a time of day based trigger event, a day of week based trigger event, a location based trigger event, a velocity based trigger event, a user based trigger event, or some combination of these.

6. The method of claim 1, wherein detecting the type of periodic and triggered location event comprises detecting the type of periodic and triggered location event at a plurality of different times; and wherein sending the location report to the wireless network comprises sending a location report to the wireless network at each of the plurality of different times in response to detecting the type of periodic and triggered location event at each of the plurality of different times, wherein the location report at each of the plurality of different times is transmitted to the external client by the wireless network.

7. The method of claim 1, further comprising:
obtaining location information based at least in part on the first codeword in response to detecting the type of periodic and triggered location event, wherein the location information comprises downlink location measurements, a location estimate or both; and
including the location information in the location report, wherein the wireless network determines a location for the UE based at least in part on the location information, wherein the location report transmitted to the external client by the wireless network includes the location.

8. The method of claim 1, wherein the type of periodic and triggered location event comprises a plurality of trigger events, wherein detecting the type of periodic and triggered location event comprises detecting a trigger event from the plurality of trigger events, and further comprising including a second codeword in the location report, wherein the second codeword identifies the trigger event from the plurality of trigger events, wherein the location report transmitted to the external client by the wireless network includes the second codeword.

9. The method of claim 1, further comprising receiving at least one of an overall duration of location reporting, a maximum number of location event reports, or a combination thereof with the request for the periodic or triggered location, and further comprising ceasing to send location reports to the wireless network when the overall duration or the maximum number of location event reports has been attained.

10. The method of claim 1, wherein the request for the periodic and triggered location further comprises an identity for the external client, and further comprising determining the type of periodic and triggered location event based on the first codeword and the identity for the external client.

11. The method of claim 1, wherein the first codeword received by the wireless network from the external client and the first codeword received by the UE from the wireless network each comprise an identical plurality of one or more identical values.

12. A user equipment (UE) capable of supporting periodic and triggered location comprising:
a wireless transceiver configured to wirelessly communicate with a wireless network;
memory configured to store codewords; and
at least one processor coupled to the wireless transceiver and the memory and configured to:
receive via the wireless transceiver a request for a periodic and triggered location from the wireless network, the request for the periodic and triggered location comprising a first codeword, the request for the periodic and triggered location and the first codeword received by the wireless network from an external client;
determine a type of periodic and triggered location event based on the first codeword, detect the type of periodic and triggered location event; and
send via the wireless transceiver a location report to the wireless network in response to detecting the type of periodic and triggered location event, wherein the location report is transmitted to the external client by the wireless network.

13. The UE of claim 12, wherein the first codeword is not interpreted by the wireless network.

14. The UE of claim 12, wherein the UE is pre-configured with the first codeword and the type of periodic and triggered location event.

15. The UE of claim 12, wherein the first codeword comprises at least one of a bit string, octet string, character string, integer or character.

16. The UE of claim 12, wherein the type of periodic and triggered location event comprises a periodic trigger event, an area based trigger event, a UE motion based trigger event, a time of day based trigger event, a day of week based trigger event, a location based trigger event, a velocity based trigger event, a user based trigger event, or some combination of these.

17. The UE of claim 12, wherein the at least one processor configured to detect the type of periodic and triggered location event is configured to detect the type of periodic and triggered location event at a plurality of different times; and wherein the at least one processor configured to send via the wireless transceiver a location report to the wireless network is configured to send via the wireless transceiver a location report to the wireless network at each of the plurality of different times in response to detecting the type of periodic and triggered location event at each of the plurality of different times, wherein the location report at each of the plurality of different times is transmitted to the external client by the wireless network.

18. The UE of claim 12, wherein the at least one processor is further configured to obtain location information based at least in part on the first codeword in response to detecting the type of periodic and triggered location event, wherein the location information comprises downlink location measurements, a location estimate or both, and include the location information in the location report, wherein the wireless network determines a location for the UE based at least in part on the location information, wherein the location report transmitted to the external client by the wireless network includes the location.

19. The UE of claim 12, wherein the type of periodic and triggered location event comprises a plurality of trigger events, wherein detecting the type of periodic and triggered location event comprises detecting a trigger event from the plurality of trigger events, and further comprising including a second codeword in the location report, wherein the second codeword identifies the trigger event from the plurality of trigger events, wherein the location report transmitted to the external client by the wireless network includes the second codeword.

20. The UE of claim 12, wherein the at least one processor is further configured to receive at least one of an overall duration of location reporting, a maximum number of location event reports, or a combination thereof with the request for the periodic or triggered location, and cease sending location reports to the wireless network when the overall duration or the maximum number of location event reports has been attained.

21. The UE of claim 12, wherein the request for the periodic and triggered location further comprises an identity for the external client, and the at least one processor is further configured to determine the type of periodic and triggered location event based on the first codeword and the identity for the external client.

22. The UE of claim 12, wherein the first codeword received by the wireless network from the external client and the first codeword received by the UE from the wireless network each comprise an identical plurality of one or more identical values.

23. A user equipment (UE) capable of supporting periodic and triggered location comprising:
- means for receiving a request for a periodic and triggered location from a wireless network, the request for the periodic and triggered location comprising a first codeword, the request for the periodic and triggered location and the first codeword received by the wireless network from an external client;
- means for determining a type of periodic and triggered location event based on the first codeword;
- means for detecting the type of periodic and triggered location event; and
- means for sending a location report to the wireless network in response to detecting the type of periodic and triggered location event, wherein the location report is transmitted to the external client by the wireless network.

24. The UE of claim 23, wherein the first codeword is not interpreted by the wireless network.

25. The UE of claim 23, wherein the UE is pre-configured with the first codeword and the type of periodic and triggered location event.

26. The UE of claim 23, wherein the first codeword comprises at least one of a bit string, octet string, character string, integer or character.

27. The UE of claim 23, further comprising:
- means for obtaining location information based at least in part on the first codeword in response to detecting the type of periodic and triggered location event, wherein the location information comprises downlink location measurements, a location estimate or both; and
- means for including the location information in the location report, wherein the wireless network determines a location for the UE based at least in part on the location information, wherein the location report transmitted to the external client by the wireless network includes the location.

28. The UE of claim 23, wherein the type of periodic and triggered location event comprises a plurality of trigger events, wherein detecting the type of periodic and triggered location event comprises detecting a trigger event from the plurality of trigger events, and further comprising including a second codeword in the location report, wherein the second codeword identifies the trigger event from the plurality of trigger events, wherein the location report transmitted to the external client by the wireless network includes the second codeword.

29. The UE of claim 23, further comprising means for receiving at least one of an overall duration of location reporting, a maximum number of location event reports, or a combination thereof with the request for the periodic or triggered location, and further comprising ceasing to send location reports to the wireless network when the overall duration or the maximum number of location event reports has been attained.

30. A non-transitory storage medium including program code stored thereon, the program code is operable to cause at least one processor in a user equipment (UE) support periodic and triggered location by the UE comprising:
- program code to receive a request for a periodic and triggered location from a wireless network, the request for the periodic and triggered location comprising a first codeword, the request for the periodic and triggered location and the first codeword received by the wireless network from an external client;
- program code to determine a type of periodic and triggered location event based on the first codeword;
- program code to detect the type of periodic and triggered location event; and
- program code to send a location report to the wireless network in response to detecting the type of periodic and triggered location event, wherein the location report is transmitted to the external client by the wireless network.

* * * * *